United States Patent
Healey

(10) Patent No.: US 8,205,508 B2
(45) Date of Patent: Jun. 26, 2012

(54) MOTORLESS MASS FLOWMETER

(75) Inventor: Christopher J Healey, Manchester, NH (US)

(73) Assignee: Meggitt (New Hampshire), Inc., Londenderry, NH (US)

( * ) Notice: Subject to any disclaimer, the term of this patent is extended or adjusted under 35 U.S.C. 154(b) by 318 days.

(21) Appl. No.: 12/686,004

(22) Filed: Jan. 12, 2010

(65) Prior Publication Data

US 2011/0167927 A1      Jul. 14, 2011

(51) Int. Cl.
*G01F 1/80* (2006.01)
*G01F 15/00* (2006.01)
(52) U.S. Cl. ............... 73/861.352; 73/861.77
(58) Field of Classification Search .............. None
See application file for complete search history.

(56) References Cited

U.S. PATENT DOCUMENTS

| | | | |
|---|---|---|---|
| 2,807,280 A * | 9/1957 | Kittredge | 137/599.11 |
| 3,807,229 A * | 4/1974 | Chiles | 73/203 |
| 3,877,304 A | 4/1975 | Vetsch | |
| 3,958,447 A | 5/1976 | Baker et al. | |
| 3,994,165 A | 11/1976 | Pfuntner et al. | |
| 4,012,957 A | 3/1977 | Chiles et al. | |
| 4,438,648 A | 3/1984 | Cheney, Jr. | |
| 5,370,001 A | 12/1994 | LaBrecque et al. | |
| 5,392,655 A | 2/1995 | Palmer et al. | |
| 6,776,055 B2 | 8/2004 | Burton et al. | |
| 2004/0007081 A1 | 1/2004 | Burton et al. | |
| 2008/0203346 A1 * | 8/2008 | Shu | 251/214 |

* cited by examiner

*Primary Examiner* — Harshad Patel
(74) *Attorney, Agent, or Firm* — Peter A. Nieves; Sheehan Phinney Bass + Green PA

(57) ABSTRACT

A motorless mass flowmeter in accordance with one embodiment of the invention comprises a turbine subassembly, a drum, and an impeller. The drum is rigidly connected to the turbine subassembly such that the drum rotates in accompaniment to rotation of the turbine subassembly. The impeller is rotationally coupled to the drum by way of a spring that allows relative rotation against the bias of the spring. The turbine subassembly has jets and bypass valves. The turbine subassembly may be implemented in the form of a laminated bypass valve structure. The laminated bypass valve structure may include an entrance layer having entrance port(s), a closure layer having closure member(s), an exit layer defining exit passage(s), and an intermediary layer forming conduit(s) for guiding fluid from entrance port(s) to exit passage(s).

11 Claims, 10 Drawing Sheets

MOTORLESS MASS FLOWMETER

FIELD OF THE INVENTION

The present invention is generally related to a motorless mass flowmeter, and more particularly is related to a motorless mass flowmeter having a turbine subassembly possessing a bypass valve system for regulation of pressure and/or rotational velocity.

BACKGROUND OF THE INVENTION

One type of motorless mass flowmeter employs a turbine driven by flow of fluid therethrough to supply torque to a drum housing an impeller at which mass of the fluid is measured.

In such mass flowmeters, the impeller may be arranged concentrically within the drum, the impeller being rotationally coupled to the drum by way of a torsion spring that allows relative rotation against the bias of the torsion spring. As the drum is made to rotate in rigid accompaniment to rotation of the turbine, impingement of flowing fluid mass on the vanes of the impeller causes rotation of the impeller to lag behind rotation of the drum against the bias of the torsion spring. By mounting magnets on the drum and the impeller, and using pickup coils to detect passage of the magnets, fluid mass can be determined as a function of the difference in time between the rotational position of the drum and the rotational position of the impeller.

Such a mass flowmeter might, for example, be used in an aircraft to measure fuel consumption. In such applications it is usually preferred for accurate measurement that the mass flowmeter be arranged in-line between the fuel supply and the engine in such fashion that all fuel consumed by the aircraft engine passes through the mass flowmeter. Alternatively, the mass flowmeter might be arranged in the fuel line in such manner that a known fraction of the fuel consumed by the engine passes through the mass flowmeter. No matter how the mass flowmeter is installed, however, it is to be expected that the mass flowmeter will be exposed to varying fuel flow rates depending on the rate of fuel consumption by the engine.

The mechanical system of such a mass flowmeter will typically have a safe or preferred range of rotational velocities within which various drags and other mechanical noise are comparatively small and there is good dynamic stability on the one hand, but there is also little danger of excessive wear or damage to the various bearings and other mechanical components on the other. In particular, the torsion spring typically employed between impeller and drum will generally have a safe or preferred range of torsional deflections, and thus a safe or preferred range of rotational velocities of the mass flowmeter, over which it can operate. Furthermore, the electronic detection system responsible for inductively detecting start and stop pulses produced by passage of drum and impeller magnets in such a mass flowmeter will similarly typically have a preferred range of rotational velocities within which detection is carried out most satisfactorily. Moreover, with respect to the fluid dynamic system of the mass flowmeter, while many of the components of the mass flowmeter may be designed to handle a wide variety of flow rates, it is difficult to design a turbine that is sensitive enough to provide adequate torque to the impeller at low flow rates yet robust enough not to exhibit poor performance at high flow rates. With conventional mass flowmeter turbines, it is possible, for example, that at high flow rates, back-pressure from the mass flowmeter will interfere with flow of fuel to the engine or otherwise adversely impact the fluid system in which the mass flowmeter is employed.

There is therefore a need for a motorless mass flowmeter having a turbine subassembly possessing a bypass valve system for regulation of pressure and/or rotational velocity. It is furthermore desired that such a bypass valve system permit the mass flowmeter to be sensitive enough to operate at low flow rates, yet be robust enough to operate without adverse effect at high flow rates. It is moreover desired that the turbine subassembly of such a motorless mass flowmeter be capable of causing an impeller to rotate at rotational velocities within a preferred range without production of adverse phenomena such as high back-pressure over a wide range of flow rates.

Furthermore, conventional mass flowmeter bypass valves may be expensive and/or difficult to manufacture. There is therefore a need for a mass flowmeter bypass valve design that is inexpensive and easy to manufacture. For example, a laminated bypass valve structure easily manufacturable from layers of stamped or punched sheet metal is desired.

Thus, a heretofore unaddressed need exists in the industry to address the aforementioned deficiencies and inadequacies.

SUMMARY

Embodiments of the present invention provide a motorless mass flowmeter and/or provide a laminated bypass valve structure for a turbine or turbine subassembly in a motorless mass flowmeter.

Briefly described, one embodiment, among others, is a motorless mass flowmeter having an inlet and an outlet defining an upstream and a downstream direction with respect to flow of fluid therethrough. The mass flowmeter may include a turbine having an axis of rotation and at least one jet defining a rotational direction. The rotational direction here is the direction of a first torque applied about the axis of rotation of the turbine when fluid is expelled from the at least one jet.

The mass flowmeter may have a bypass valve system arranged in parallel fashion with respect to the at least one jet. The bypass valve system may have at least one first valve. The first valve may open as pressure increases upstream therefrom to direct fluid through at least one first passage. Flow of fluid through the first passage may cause a second torque to be applied about the axis of rotation of the turbine. The second torque here may also be in the rotational direction. The bypass valve system may also have at least one second valve disposed in series with and downstream from the at least one first valve. The second valve may open as pressure increases upstream therefrom to direct fluid through at least one second passage. Flow of fluid through the second passage may cause a third torque to be applied about the axis of rotation of the turbine. The third torque here may be in a counterrotational direction opposite the rotational direction. The bypass valve system may also have at least one third valve disposed in parallel fashion with respect to the at least one first valve and the at least one second valve. The third valve may open as pressure increases upstream therefrom to direct fluid through at least one third passage. Flow of fluid through the third passage may cause substantially no application of torque about the axis of rotation of the turbine.

Another embodiment is a motorless mass flowmeter having an inlet and an outlet for flow of fluid therethrough. The mass flowmeter may include a turbine subassembly; a drum rigidly connected to the turbine subassembly such that the drum rotates in accompaniment to rotation of the turbine subassembly; and an impeller rotationally coupled to the drum by way of a spring that allows relative rotation against the bias of the spring.

The turbine subassembly may have a first set of jets causing a first torque to be applied about a rotational axis of the turbine subassembly as fluid flows therethrough. The first torque here may tend to cause the turbine subassembly to rotate in a first direction. The turbine subassembly may also have a second set of jets causing a second torque to be applied about the rotational axis of the turbine subassembly as fluid flows therethrough. The turbine subassembly may also have a first set of bypass valves. The first set of bypass valves may cause an increasing amount of fluid to be diverted from the first set of jets to the second set of jets with increasing flow of fluid through the mass flowmeter.

The second torque may tend to cause the turbine subassembly to rotate in the same direction as the first torque. Alternatively, the second torque may tend to cause the turbine subassembly to rotate in a second direction that is opposite the first direction.

The turbine subassembly may also have a third set of jets causing a third torque to be applied about the rotational axis of the turbine subassembly as fluid flows therethrough. The turbine subassembly may also have a second set of bypass valves. The second set of bypass valves may cause an increasing amount of fluid to be diverted from the first set of jets to the third set of jets with increasing flow of fluid through the mass flowmeter.

The third torque may tend to cause the turbine subassembly to rotate in the same direction as the first torque. Alternatively, the third torque may tend to cause the turbine subassembly to rotate in a second direction that is opposite the first direction.

The turbine subassembly may also have a third set of bypass valves. The third set of bypass valves may cause an increasing amount of fluid to be diverted away from the first set of jets with increasing flow of fluid through the mass flowmeter. The diversion of fluid away from the first set of jets by the third set of bypass valves may cause application of substantially no torque about the rotational axis of the turbine subassembly.

Yet another embodiment of the present invention is a laminated bypass valve structure. The laminated bypass valve structure may permit regulation of rotational velocity of a turbine defining an axis of rotation and a circumferential direction. The turbine may be present in a motorless mass flowmeter having an inlet and an outlet defining an upstream and a downstream direction with respect to flow of fluid therethrough. In some embodiments, the laminated bypass valve structure includes an entrance layer, a closure layer, an exit layer, and an intermediary layer.

Other embodiments, systems, methods, features, and advantages of the present invention will be or become apparent to one with ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
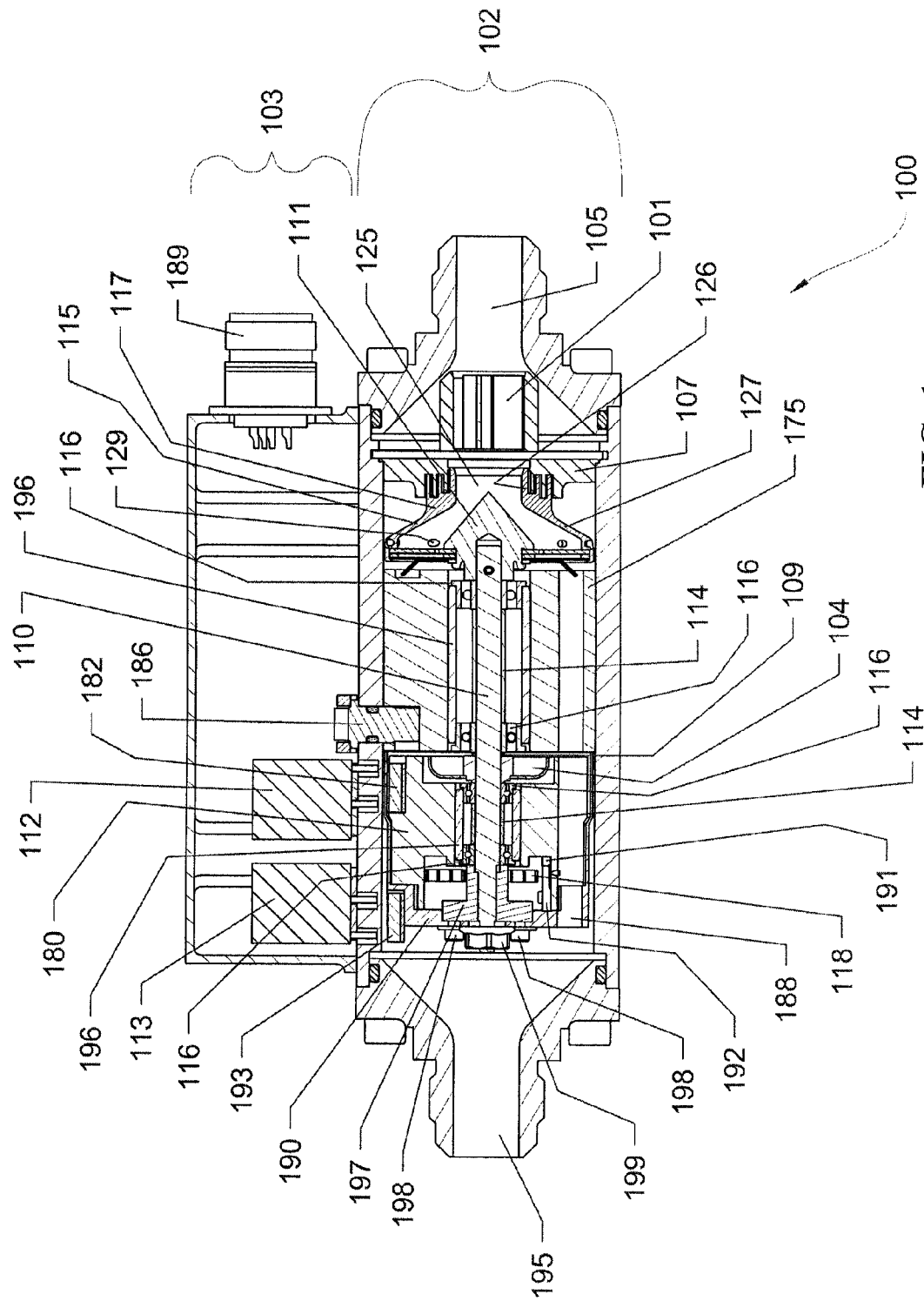
FIG. 1 is a schematic side sectional view of a mass flowmeter in accordance with a first embodiment of the present invention.

Referring to FIG. 1, this shows a mass flowmeter 100 in accordance with a first embodiment of the present invention. The mass flowmeter 100 of FIG. 1 has a housing main body 102 and a housing coil enclosure 103. During operation, fluid flows through the housing main body 102 and drives various mechanical parts therewithin as will be described in detail below. The housing coil enclosure 103 is mounted above the housing main body 102 and contains an impeller pickup coil 112 and a drum pickup coil 113, the functions of which are described below.

The housing main body 102 of the mass flowmeter 100 of FIG. 1 has a housing inlet 105 and a housing outlet 195 at either end thereof. The housing inlet 105 and the housing outlet 195 define upstream and downstream directions, fluid entering the housing inlet 105 and exiting from the housing outlet 195 being said to flow from upstream to downstream. Immediately downstream from the housing inlet 105 are an inlet flow straightener 101 and an inlet labyrinth 107, these being rigidly coupled to the housing main body 102. Immediately downstream from the inlet labyrinth 107 is a shroud labyrinth 117, this being rigidly coupled to rotatable parts including a turbine subassembly 115.

The inlet flow straightener 101 is rigidly coupled to the housing main body 102 so as to remain stationary relative to rotatable components including the turbine subassembly 115, an impeller 180, and a drum 190. In the present embodiment, the inlet flow straightener 101 is disposed downstream from the housing inlet 105 and upstream from the turbine subassembly 115. The inlet flow straightener 101 may contain any suitable arrangement of through-hole-like passages capable of reducing angular momentum of fluid as it passes from the housing inlet 105 to the turbine subassembly 115. Although not necessarily apparent from the sectional view of FIG. 1, the inlet flow straightener 101 in the present embodiment has three axially directed cylinders arranged in tightly packed fashion so as to be inscribed within a larger axially directed cylinder. The three cylindrical passages, as well as the irregularly shaped passages formed in the interstices between adjacent cylinders, serve to straighten flow, or reduce angular momentum, of fluid passing therethrough. There is no particular limitation with respect to material of the inlet flow straightener 101, but as one example, corrosion-resistant AISI 303 steel, passivated in accordance with MIL-S-5002, might be employed.

In one embodiment, as shown in FIG. 1, a labyrinth seal formed by the combination of the inlet labyrinth 107 attached to the inlet flow straightener 101 and the shroud labyrinth 117 attached to a turbine shroud 120 near a shroud inlet 125 allows the turbine subassembly 115 (together with internal components coupled thereto) to rotate relative to the housing main body 102 while at the same time ensuring that the majority of the fluid enters the turbine subassembly 115. There is no particular limitation with respect to material of the inlet labyrinth 107 and of the shroud labyrinth 117, but as one example, 6061-T651 aluminum alloy, having chromate conversion coating in accordance with MIL-C-5541 Class 1A, might be employed. In forming this labyrinth seal, the inlet labyrinth 107 and the shroud labyrinth 117 mate with narrow clearance therebetween to form labyrinthine passages that will permit mutual rotation therebetween, but will present high resistance to leakage of fluid therepast.

Figure 2:
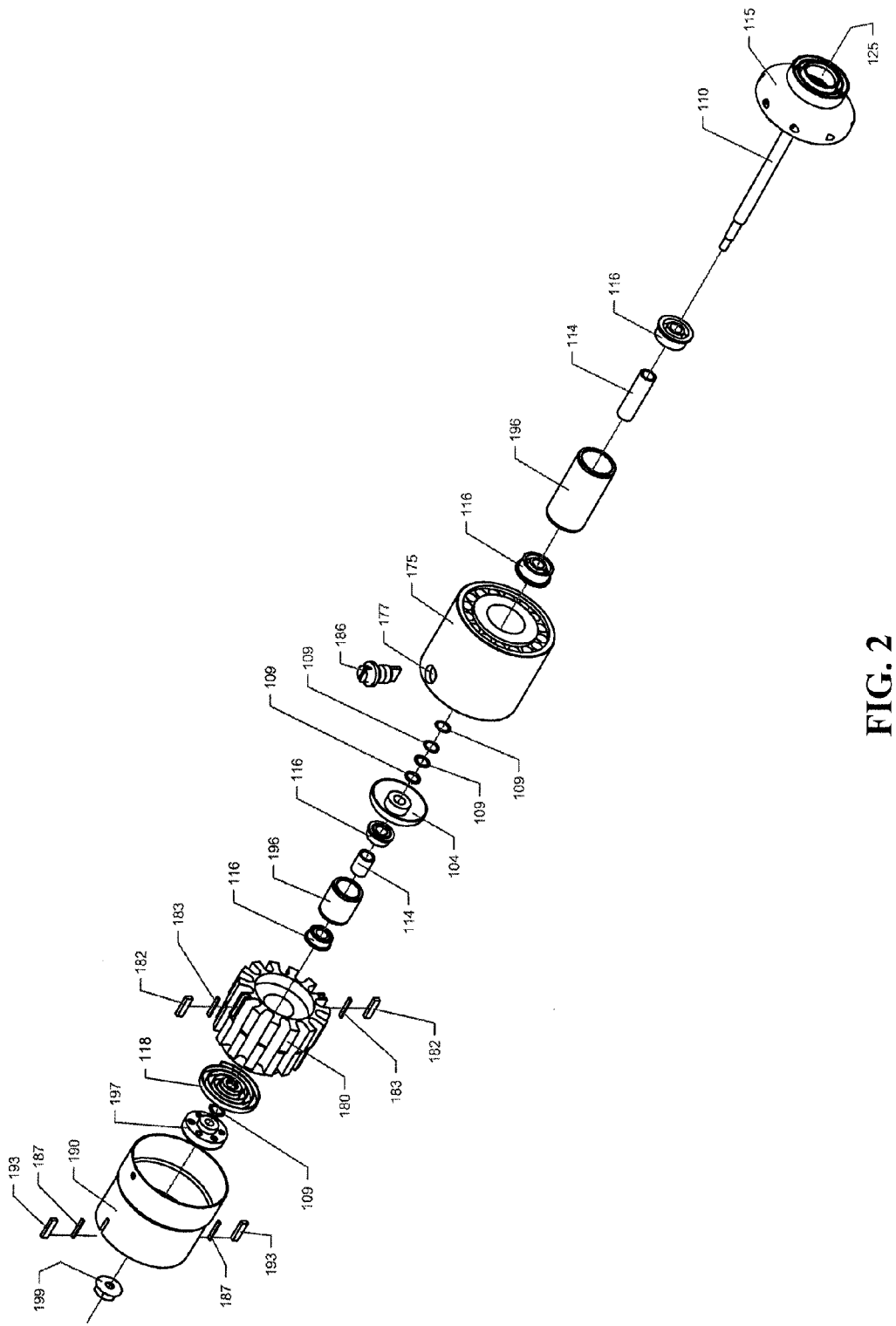
FIG. 2 is an exploded perspective view showing internal components present within the housing main body of the mass flowmeter of FIG. 1.

In addition to the side sectional view of the inlet labyrinth 107 and the shroud labyrinth 117 shown in FIG. 1, a perspective view of the shroud labyrinth 117 can be seen at FIG. 2. Comparatively little fluid therefore leaks past the labyrinth seal, the bulk of the fluid instead being guided to the shroud inlet 125 of the turbine subassembly 115. That is, the labyrinth seal matably and rotatably couples the inlet flow straightener 101 to the turbine subassembly 115. The inlet labyrinth 107 may be integral with the inlet flow straightener 101, and the shroud labyrinth 117 may be integral with the turbine shroud 120. Alternatively, the inlet labyrinth 107 may be attached to the inlet flow straightener 101, and the shroud labyrinth 117 may be attached to the turbine shroud 120, by any suitable means, including, without limitation, press-fit, adhesive, welding, brazing, soldering, or using any of various mechanical fasteners such as rivets or screws.

With continued reference to FIG. 1 and additional reference now to FIG. 2, FIG. 2 is an exploded view showing internal components present within the housing main body 102 of the mass flowmeter 100 of FIG. 1. Shown in FIG. 1 but omitted for brevity at FIG. 2 are the housing inlet 105, the inlet flow straightener 101, the inlet labyrinth 107, and the housing outlet 195. The internal components shown in FIG. 2 include the turbine subassembly 115, an internal flow straightener 175, an impeller 180, and the drum 190. The plane of the section in the side sectional view of FIG. 1 has been chosen such that one of the passages of the internal flow straightener 175 is shown approximately aligned with one of the spaces formed between vanes of the impeller 180 in the lower half of the drawing, and such that one of the walls formed between passages of the internal flow straightener 175 is shown approximately aligned with one of the vanes of the impeller 180 in the upper half of the drawing.

During operation in at least one flow rate domain, fluid expelled from jets 129 (FIG. 1) at the periphery of the turbine subassembly 115 causes the turbine subassembly 115 to rotate. A shaft 110 rigidly connecting the turbine subassembly 115 to the drum 190 causes the drum 190 to rotate in rigid accompaniment to rotation of the turbine subassembly 115.

A turbine-side hub 111 (FIG. 1) rigidly mounted to the upstream end of the shaft 110 couples the shaft 110 to the turbine subassembly 115. An outlet-side hub 197 rigidly mounted to the downstream end of the shaft 110 couples the shaft 110 to the drum 190.

The internal flow straightener 175 is rigidly coupled to the housing main body 102 so as to remain stationary relative to rotatable components including the turbine subassembly 115, the impeller 180, and the drum 190. The internal flow straightener 175 is disposed downstream from the turbine subassembly 115 and upstream from the impeller 180, the internal flow straightener reducing angular momentum of fluid as it passes from the turbine subassembly 115 to the impeller 180. As can be seen at FIG. 2, the internal flow straightener 175 in the present embodiment has a plurality of axially directed cylindrical passages in a rotationally symmetric pattern or otherwise spaced at regular angular intervals after the fashion of a revolver barrel (hereinafter "revolver-like arrangement"). Fluid exiting the turbine subassembly 115 and passing through the internal flow straightener 175 is robbed of its rotational component (angular momentum) as a result of passage therethrough. The majority of the fluid whose flow has been straightened as a result of passage through the internal flow straightener 175 enters the spaces between the vanes of the impeller 180, as shown in the lower half of FIG. 1, the passages of the internal flow straightener 175 and the spaces between vanes of the impeller 180 being sufficiently mutually aligned much of the time to allow such flow despite rotation of the impeller 180 relative to the stationary internal flow straightener 175.

During calibration, a hole 177 on the internal flow straightener 175 allows insertion of a calibrator skew vane 186 for modifying angular momentum of fluid before it enters the impeller 180. The calibrator skew vane 186 is inserted into the hole 177 in the internal flow straightener 175 by way of a hole in the housing main body 102, the portion of the calibrator skew vane 186 extending into the interior of the internal flow straightener 175 deflecting fluid in correspondence to the angle at which the calibrator skew vane 186 is turned. An o-ring is used to seal the space between the calibrator skew vane 186 and the housing main body 102, and a threaded collar is used to hold the inserted calibrator skew vane 186 in place within the hole in the housing main body 102.

Continuing with description of operation, fluid not entering the spaces between the vanes of the impeller 180, but instead wandering radially inward along the gap between the internal flow straightener 175 and the impeller 180, for example due to its having splashed edgewise against the vanes of the impeller 180 as it exits the internal flow straightener 175, encounters a barrier in the form of a viscous decoupler 104. The viscous decoupler 104 is disposed at the upstream side of the impeller 180 and substantially prevents the viscous drag of the fluid from adversely affecting rotation of the impeller 180. In the present embodiment, the viscous decoupler 104 is disposed within a cavity-like region at the upstream side of the impeller 180. The viscous decoupler 104 functions as a splash shield to prevent wandering fluid that failed to enter the spaces between the vanes of the impeller 180 from adversely affecting rotation of the impeller 180. That is, since viscous sheer forces from such wandering fluid could adversely affect measurement of mass flow if such wandering fluid were allowed to impinge directly on the impeller 180, such wandering fluid is collected and allowed to lose any excessive swirling and turbulence before being guided back to the region radially outward therefrom for another chance to pass through the spaces between the vanes of the impeller 180. Fluid passing through the spaces between the vanes of the impeller 180 exits the mass flowmeter 100 by way of exit passages 188 (FIG. 1) in the drum 190 and thereafter by way of the housing outlet 195 (FIG. 1). As with the cylindrical passages of the internal flow straightener 175, the drum exit passages 188 may be in a revolver-like arrangement.

In the present embodiment, the impeller 180 is arranged concentrically within the drum 190, the impeller 180 being rotationally coupled to the drum 190 by way of a torsion spring 118 that allows relative rotation therebetween against the bias of the torsion spring 118. As the drum 190 is made to rotate in rigid accompaniment to rotation of the turbine subassembly 115, impingement of flowing fluid mass on the vanes of the impeller 180 causes rotation of the impeller 180 to lag behind rotation of the drum 190 against the bias of the torsion spring 118. Mass flow rate may be determined as a function of the difference in time of occurrence of a start pulse inductively generated in the drum pickup coil 113 by a drum magnet 193 mounted on the drum 190 and a stop pulse inductively generated in the impeller pickup coil 112 by an impeller magnet 182 mounted to the impeller 180.

In the present embodiment, the torsion spring 118 is disposed within a cavity-like region at the downstream side of the impeller 180. One end of the torsion spring 118 is rigidly coupled to the drum 190 as a result of being secured to the outside circumferential surface of the outlet-side hub 197 at the downstream end of the shaft 110 by means of a threaded clamping member in combination with a self-clinching nut of the type sold by, for example, Penn Engineering of Danboro, Pa., or other suitable means. The other end of the torsion spring 118 is rigidly coupled to the impeller 180 as a result of being secured to the inside circumferential surface of the impeller 180 by means of a torsion spring hold-down clamp 192 (FIG. 1) in combination with a torsion spring guide pin 191 (FIG. 1).

Each impeller magnet 182 has an impeller magnet yoke 183 (FIG. 2) that guides magnetic flux from the impeller magnet 182 so as to complete a magnetic circuit when in proximity with a C- or U-shaped ferrite core (not shown) about which the impeller pickup coil 112 is wrapped. Moreover, each drum magnet 193 has a drum magnet yoke 187 (FIG. 2) that guides magnetic flux from the drum magnet 193 so as to complete a magnetic circuit when in proximity with a C- or U-shaped ferrite core (not shown) about which the drum pickup coil 113 is wrapped. Signals from the respective coils 112, 113 are communicated to signal processing circuitry by way of an electrical connector 189 (FIG. 1).

Spacers 114, bearings 116, bearing retainers 196, and shims 109 assist in ensuring proper relative placement of and smooth movement between mechanical components. One bearing retainer 196 may be press-fit within a central hole in the internal flow straightener 175, and another bearing retainer 196 may be press-fit within a central hole in the impeller 180. Screws and bolts 198 threadedly mate with similarly threaded parts or nuts 199 to locate and/or hold parts.

In the present embodiment, the shaft 110 that couples rotation of the turbine subassembly 115 to the drum 190 defines an axial direction, inasmuch as the axis of this shaft 110 about which the turbine subassembly 115, drum 190, and impeller 180 rotate may be taken to be the axis of the internal components of the mass flowmeter 100. Moreover, a circumferential direction is also defined by this shaft 110, the circumferential direction being in the direction of the circumference of a circle lying in a plane perpendicular to the axis of the shaft 110 and centered on the axis of the shaft 110. Note that even were the shaft 110 not present, it would still be possible to define an axis of the internal components of the mass flowmeter 100, this being the axis of rotation of the turbine subassembly 115, drum 190, and impeller 180. Moreover, even in the context of designs in which the axes of internal components such as the turbine subassembly 115, drum 190, and impeller 180 are not necessarily collinear, there will in general be a well-defined axis of the turbine subassembly 115, a well-defined axis of the drum 190, and a well-defined axis of the impeller 180, these being the respective axes about which these respective parts rotate during operation, and consequently there will likewise be well-defined circumferential directions for each.

The foregoing is an overview of the components and operation of the mass flowmeter 100. Below, the turbine subassembly 115 of the mass flowmeter 100 of the present embodiment is described in further detail.

As shown in FIG. 1, fluid entering the mass flowmeter 100 from the housing inlet 105 and passing through the inlet flow straightener 101 thereafter enters the turbine subassembly 115 by way of a shroud inlet 125, this being the inlet portion of a turbine shroud 120 that is described in further detail below with reference to FIG. 5.

Figure 3:
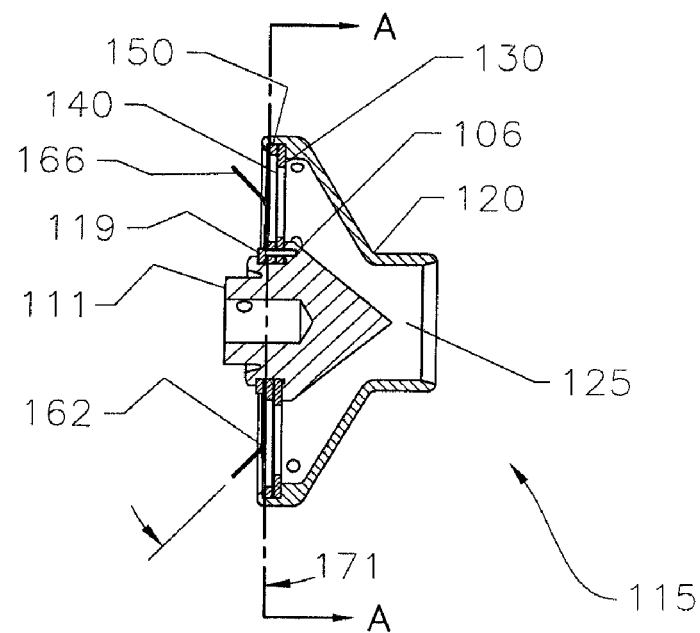
FIG. 3 is a side sectional view showing a turbine subassembly in the mass flowmeter of FIGS. 1 and 2.

Referring to FIG. 3, this is a side sectional view of the turbine subassembly 115. Note that the shroud labyrinth 117 shown in FIGS. 1 and 2 has, for clarity, been removed from the turbine subassembly 115 shown in FIG. 3, but the shroud labyrinth 117 is shown installed on the turbine shroud 120 at FIG. 5.

Figure 5:
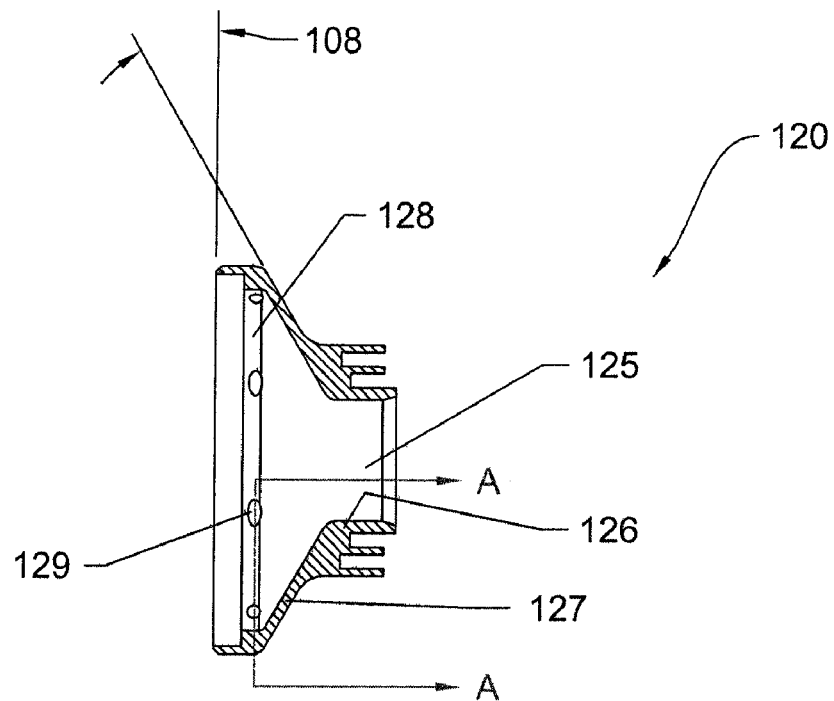
FIG. 5 is a side sectional view of the turbine shroud of the turbine subassembly shown in FIGS. 3 and 4.

As seen in FIGS. 3 and 5, the turbine subassembly 115 has a turbine shroud 120 that, together with the turbine-side hub 111, bounds a space forming a cavity through which fluid entering the turbine subassembly 115 is guided following entry thereinto by way of the shroud inlet 125 and shroud neck region 126 (FIG. 5). As seen in FIG. 3, the turbine subassembly 115 also has a series of annular plates, these annular plates in the present embodiment being, in order from the upstream side, an entrance plate 130, a closure plate 140, an intermediary plate 150, and an exit plate 162. During assembly, these annular plates 130, 140, 150, 162 are stacked on shelf-like regions at the outside circumferential surface of the turbine-side hub 111 and the inside circumferential surface of the turbine shroud 120, at which time the central holes 131, 141, 151, 161 (respectively visible at FIGS. 7, 8, 10, and 13) of these annular plates 130, 140, 150, 162 are aligned such that their centers lie on or approximately lie on the axis of the turbine-side hub 111, and the annular plates 130, 140, 150, 162 are furthermore aligned with respect to their positions in terms of angular rotation about the axis of the turbine subassembly 115 by means of a spiral pin or other such alignment pin 106 that is made to pass through alignment holes 137, 147, 157, 167 (respectively visible at FIGS. 7, 8, 10, and 13) present in the plates 130, 140, 150, 162. In one embodiment, the annular plates 130, 140, 150, 162 might each have an inside diameter of 0.500 inch (corresponding to the diameter of the central holes 131, 141, 151, 161), in correspondence to which the outside diameter at the outside circumferential surface of the turbine-side hub 111 is of appropriate size slightly smaller than this. Furthermore, the annular plates 130, 140, 150, 162 might each have an outside diameter of 1.531 inch, in correspondence to which the inside diameter at the inside circumferential surface of the turbine shroud 120 is of appropriate size slightly larger than this. Moreover, the alignment holes 137, 147, 157, 167 might each have a diameter of 0.035 inch, in correspondence to which the outside diameter of the alignment pin 106 is of appropriate size slightly smaller than this.

With the plates 130, 140, 150, 162 stacked in this configuration, one or more flat washers 119 to distribute force and protect the underlying plates 130, 140, 150, 162 are preferably stacked atop the downstream-most plate, this being the exit plate 162, at the inner and/or outer edges thereof (a washer 119 being shown at only the inner edge in the embodiment of FIG. 3), before overhanging regions projecting in the downstream direction from the rims at the outside circumferential surface of the turbine-side hub 111 and the inside circumferential surface of the turbine shroud 120 are swaged to respectively capture the inner edges and the outer edges of the plates 130, 140, 150, 162 tightly thereunder against the support of those shelf-like regions. There is no particular limitation with respect to material of the turbine shroud 120 and the turbine-side hub 111, but as one example, 6061-T651 aluminum alloy, having chromate conversion coating in accordance with MIL-C-5541 Class 1A, might be employed. Where swaging is carried out to capture the plates 130, 140, 150, 162 under the rims of the turbine shroud 120 and the turbine-side hub 111 as described above, the material employed for the turbine shroud 120 and the turbine-side hub 111 is preferably such as to allow this swaging operation to be carried out. Of course, one of ordinary skill in the art will recognize that there are a great many methods other than swaging that can be employed to capture and hold these plates 130, 140, 150, 162, and where such other methods are employed there will of course be even greater latitude in the choice of material used at the turbine shroud 120 and the turbine-side hub 111.

This stacked series of annular plates 130, 140, 150, 162 constitutes a laminated bypass valve structure, the individual plates 130, 140, 150, 162 thereof having features, described in more detail with reference to FIG. 4 and FIGS. 7 through 16, that cooperate to form bypass valves for relieving pressure and/or flow at the jets 129 of the turbine shroud 120, for providing a rotational torque in the same direction as the torque from the jets 129 of the turbine shroud 120, and/or for providing a counterrotational torque in a direction opposite the direction of the torque from the jets 129 of the turbine shroud 120, to regulate the rotational velocity of the mass flowmeter 100. Furthermore, as fluid at the space in the cavity between the turbine-side hub 111 (FIG. 3) and a tapered portion 127 (FIG. 5) of the turbine shroud 120 can pass through the turbine subassembly 115 by way of the jets 129 at the turbine shroud 120 or by way of the laminated bypass valve system possessing these bypass valves (when one or more of these bypass valves is open), this bypass valve system can be said to be arranged in parallel fashion with respect to the jets 129 at the turbine shroud 120.

Figure 4:
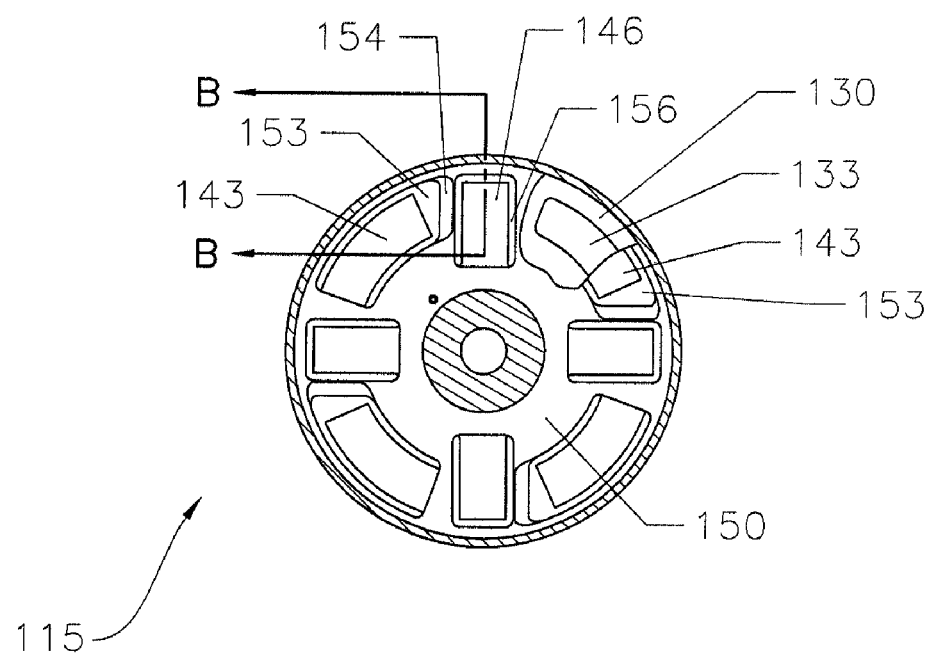
FIG. 4 is a sectional rear view, as seen from the downstream direction, of section A-A of the turbine subassembly indicated in FIG. 3.

FIG. 4 is a sectional rear view, as seen from the downstream direction, of section A-A of the turbine subassembly 115 indicated in FIG. 3, and will be referred to again below during description of this laminated bypass valve structure. At FIG. 4, note that the exit plate subassembly 160 has been removed for clarity and the region around the circumferential valve in the upper right quadrant of the drawing is shown in cutaway fashion to reveal the circumferential valve entrance port 133 which would otherwise be hidden beneath the circumferential valve closure member 143.

Figure 6:
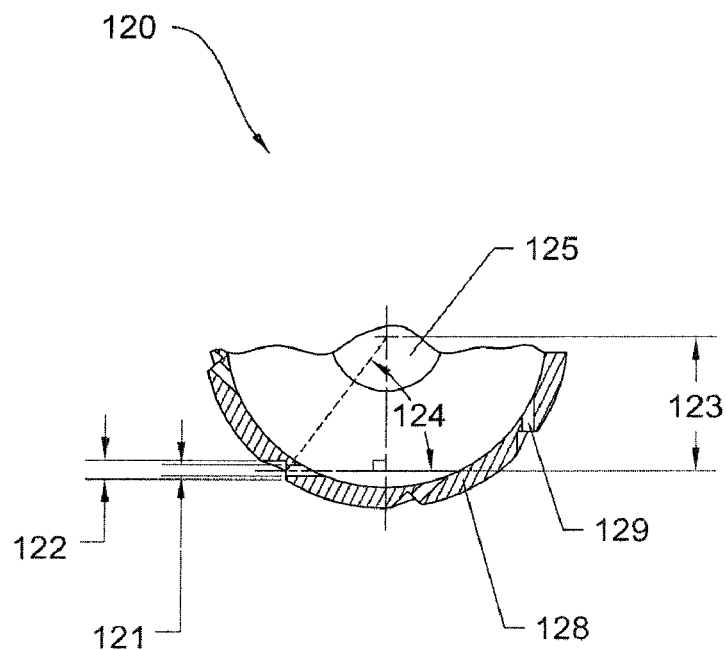
FIG. 6 is a sectional rear view, as seen from the downstream direction, of section A-A of the turbine shroud indicated in FIG. 5.

FIG. 5 is a side sectional view of the turbine shroud 120 of the turbine subassembly 115 shown in FIGS. 3 and 4. FIG. 6 is a sectional rear view, as seen from the downstream direction, of section A-A of the turbine shroud 120 indicated in FIG. 5. Note that the shaft 110, turbine-side hub 111, and laminated bypass valve structure visible at FIGS. 3 and 4 are, for clarity, not shown at FIGS. 5 and 6.

Referring to FIGS. 5 and 6, the turbine shroud 120 in the present embodiment is integral with the turbine subassembly 115, meaning that the turbine shroud 120 rotates together with the various parts making up the turbine subassembly 115. As explained in the description given with respect to FIG. 1, this is made possible, without significant leakage outside of the path that leads through the shroud inlet 125 and into the turbine subassembly 115, by the labyrinth seal at the housing inlet side of the turbine shroud 120. As best understood by referring back and forth between FIGS. 3 and 5, fluid entering the shroud inlet 125 passes through the shroud neck region 126 and is guided along a space formed in the cavity between the turbine-side hub 111 and the tapered portion 127 of the turbine shroud 120. This tapered portion 127 of the turbine shroud 120 forms an angle 108 of, for example, 30 degrees with a plane perpendicular to the axis of the turbine shroud 120. At least a portion of the fluid traveling along this shroud tapered portion 127 exits the turbine subassembly 115 by way of a plurality of turbine jets 129 arranged in a ring-shaped locus 128 around the periphery of the turbine shroud 120. This ring 128 of jets 129 may be fashioned directly from the peripheral wall of the turbine shroud 120 or may be separately fashioned from a collar- or ring-like part that is inserted within and joined by any suitable method to the turbine shroud 120. In the present embodiment, this shroud jet ring 128 has eight jets 129 spaced at uniform angular pitch about the axis of the turbine subassembly 115. There is of course no particular objection to employment of a different number of jets 129 in the shroud jet ring 128, but it is preferred for dynamic stability that the jets 129 of this shroud jet ring 128 be arranged in symmetric and/or balanced fashion so as to balance the loads and/or torques produced thereby. In the present embodiment, this shroud jet ring 128 of eight jets 129 constitutes one set of jets 129 causing a torque to be applied about the rotational axis of the turbine subassembly 115 as fluid flows therethrough. This torque from the jets 129 of the turbine shroud 120 will tend to cause the turbine subassembly 115 to rotate in a direction referred to herein as the rotational direction. With jets 129 oriented as shown in FIG. 6 so as to expel fluid therefrom in a clockwise direction about the axis of the turbine subassembly 115 as seen from the downstream direction, the torque produced by this set of jets 129 will be in a counterclockwise direction as seen from the downstream direction.

As shown in FIG. 6, the jets 129 at the turbine shroud 120 in the present embodiment are through-holes in the shroud jet ring 128, these through-holes having hole axes lying in a plane substantially perpendicular to the rotational axis of the turbine subassembly 115. That is, in the present embodiment, the axes of the jets 129 at the turbine shroud 120 have substantially no component in the direction of the axis of the turbine subassembly 115, as a result of which fluid expelled from the jets 129 at the turbine shroud 120 tends to have a velocity component in a plane perpendicular to the axis of the turbine subassembly 115 and tends not to have a velocity component in a direction parallel to the rotational axis of the turbine subassembly 115. Besides increasing the amount of energy available for driving the turbine subassembly 115 rotationally, this decreases spurious torques in undesirable directions as well as shifting of components along the axis of the turbine subassembly 115, and may also reduce or eliminate the need for thrust bearings and/or washers.

Furthermore, each of these jets 129 might have a jet narrow-bore region 121 that is interior to and collinear with a jet wide-bore region 122. For example, in one embodiment, the diameter of the jet narrow-bore region 121 might be on the order of 0.052 inch, and the diameter of the jet wide-bore region 122 might be on the order of 0.093 inch. Furthermore, the axes of the jet narrow-bore region 121 and the jet wide-bore region 122 might, for example, make a jetting angle 124 of, for example, 55 degrees with a radius drawn from the axis of the turbine subassembly 115, in which case the torque moment arm 123 of each of the jets 129 will be on the order of this radius times the sine of the jetting angle 124, or on the order of 0.625 inch if the radius drawn from the axis of the turbine subassembly 115 to the location on the shroud jet ring 128 at which the jet 129 is arranged is taken to be, for example, 0.760 inch. Although it is here assumed for simplicity that the jets 129 at the turbine shroud 120 all have similar dimensions and are oriented similarly, there is no particular objection to employment of jets 129 having respectively different dimensions and/or orientations, but it is preferred for dynamic stability that the jets 129 be arranged in symmetric and/or balanced fashion so as to balance the loads and/or torques produced thereby.

In the context of description of the annular plates 130, 140, 150, 162 making up the laminated bypass valve structure of the present embodiment, the radial direction is taken to be the direction of a radius in a plane perpendicular to the axis of the annular plate 130, 140, 150, 162. The circumferential direction is taken to be the direction along the circumference of a circle having center along the axis of the annular plate 130, 140, 150, 162 and lying in a plane perpendicular to that axis. Note that the axes of the annular plates 130, 140, 150, 162 coincide or approximately coincide with the axis of the turbine subassembly 115 after the plates 130, 140, 150, 162 have been assembled together with the turbine shroud 120 and turbine-side hub 111 to form the turbine subassembly 115. Note that while these definitions for the radial and circumferential directions are used consistently throughout this document, and the radial and circumferential valves introduced with reference to FIG. 7 below have profiles that are respectively oriented in generally radial and circumferential directions, the terms "radial" and "circumferential" as applied to valves are better understood in functional terms based on whether fluid passing therethrough tends to be expelled therefrom with a velocity component in the circumferential direction (circumferential valves having such a velocity component and radial valves not having such a velocity component), as will be made clearer in the description given below with reference to FIG. 13.

Figure 7:
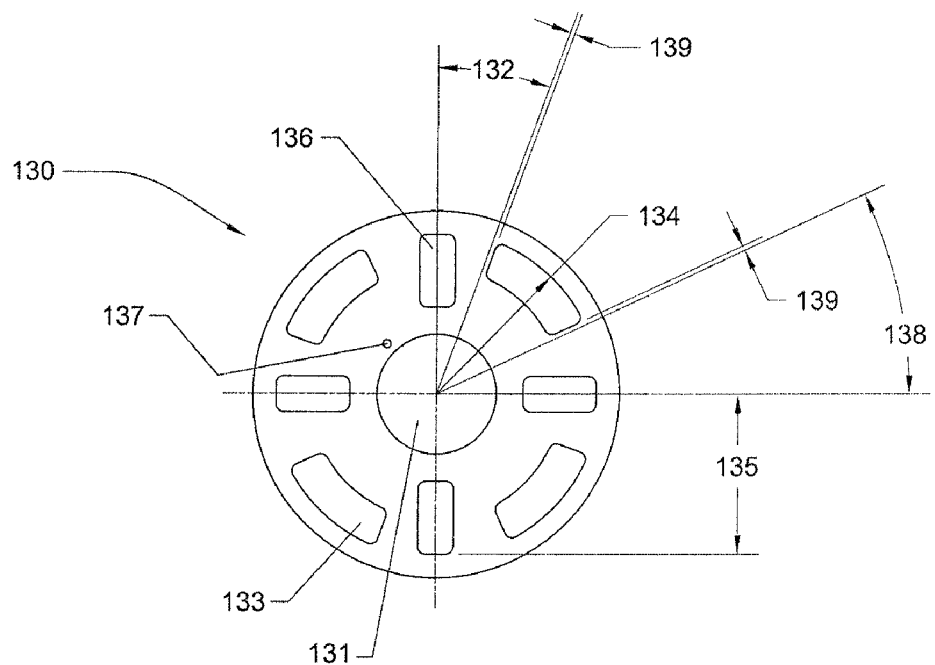
FIG. 7 is a rear view, as seen from the downstream direction, of the entrance plate of the turbine subassembly shown in FIGS. 3 and 4.

Referring to FIG. 7, this is a rear view, as seen from the downstream direction, of the entrance plate 130. The entrance plate 130 serves as an entrance layer and is the upstream-most plate among the plates 130, 140, 150, 162 making up the laminated bypass valve structure shown in FIGS. 3 and 4. In the present description, the features of the entrance plate 130 will serve as a baseline or reference relative to which the features of the remaining plates making up the laminated bypass valve structure can be conveniently described. However, note that in some cases it will be convenient to give what are referred to herein as nominal values for valve dimensions, these nominal values being dimensions measured not to edges of entrance port features in the entrance plate 130 but to edges of closure member features in the closure plate 140, as will be described in more detail below.

In addition to the entrance plate central hole 131 and the entrance plate alignment hole 137, the purposes of which were explained above in the description given with reference to FIG. 3, the entrance plate 130 in the present embodiment has a set of four circumferential valve entrance ports 133 serving as entrance ports for four (primary) circumferential valves, and also has a set of four radial valve entrance ports 136 serving as entrance ports for four radial valves. In the present embodiment, the four radial valve entrance ports 136 are arranged at uniform angular pitch so as to be 90 degrees apart. Furthermore, in the present embodiment, the four circumferential valve entrance ports 133 are arranged at uniform angular pitch so as to be 90 degrees apart. In the present embodiment, the circumferential valve entrance ports 133 (and thus the circumferential valves) and the radial valve entrance ports 136 (and thus the radial valves) are arranged in alternating fashion circumferentially about the axis of rotation of the turbine. As described in further detail below, the circumferential valve entrance ports 133 are preferably not located at angular positions exactly midway, or at angular positions of 45 degrees, between radial valve entrance ports 136, but are located at angular positions rotated counterclockwise by some amount, such as, but not limited to, 2.5 degrees, from such midway angular positions, as viewed from the downstream direction.

In the present embodiment, these entrance ports 133, 136 might simply be through-holes. There is no particular limitation with respect to material or thickness of the entrance plate 130, but as one example, full-hard precision stainless steel (such as CRES AISI Type 302 of hardness 40-45 Rc) of thickness 0.031 inch, having surface passivation treatment in accordance with MIL-S-5002, might be employed.

The entrance plate 130 has an upstream side and a downstream side. Each entrance port 133, 136 in the entrance plate 130 allows fluid to enter from the upstream side thereof. The periphery on the downstream side of each entrance port 133, 136 defines a valve seat against which a corresponding number of closure members 143, 146 in the closure plate 140, described below, can seal.

As will become clear from the description given below, in the present embodiment, these entrance ports 133, 136 cooperate with corresponding closure members in the closure plate 140 to form four circumferential valves and four radial valves. As the present embodiment also employs a set of four secondary circumferential valves at the exit plate subassembly 160, described below, the circumferential valves referred to herein, where not described specifically as secondary circumferential valves, should be understood to refer to the circumferential valves formed by combination of the circumferential valve entrance ports 133 and circumferential valve closure members 143, described below. Although these circumferential valves formed by combination of the circumferential valve entrance ports 133 and the circumferential valve closure members 143 may on occasion be referred to as primary circumferential valves so as to more clearly distinguish them from the secondary circumferential valves at the exit plate subassembly 160, note that the qualifier "primary" is in general omitted for convenience of description.

As with arrangement of the set of jets 129 at the turbine shroud 120, while one of ordinary skill in the art will appreciate that a great many variations are possible with respect to the dimensions and number of valves that may be employed, it is preferred for dynamic stability that the valves of this laminated bypass valve structure be arranged in symmetric and/or balanced fashion circumferentially about the axis of rotation of the turbine so as to balance any loads and/or torques produced thereby. To facilitate arrangement in symmetric and/or balanced fashion circumferentially about the axis of rotation of the turbine, a plurality (four, in the present embodiment) of circumferential valves and a plurality (four, in the present embodiment) of radial valves may be employed.

Although the radial valve entrance ports 136, and thus the radial valves, are shown as being rectangular in shape, the present invention is not limited thereto, it being possible to employ radial valve entrance ports 136, and thus radial valves, of a wide variety of shapes. In the present embodiment, the radial valves serve as non-torque-producing valves, meaning that substantially no torque is applied about the axis of the turbine subassembly 115 as a result of passage of fluid therethrough. One of ordinary skill in the art will appreciate that any of a wide variety of configurations may be employed as non-torque-producing valves, and thus that any of a wide variety of shapes may be employed as radial valve entrance ports 136.

Although the circumferential valve entrance ports 133, and thus the circumferential valves, are shown as being arcuate in shape, the present invention is not limited thereto, it being possible to employ circumferential valve entrance ports 133, and thus circumferential valves, of a wide variety of shapes. In the present embodiment, the circumferential valves serve as torque-producing valves, meaning that torque is in general applied about the axis of the turbine subassembly 115 as a result of passage of fluid therethrough. One of ordinary skill in the art will appreciate that any of a wide variety of configurations may be employed as torque-producing valves, and thus that any of a wide variety of shapes may be employed as circumferential valve entrance ports 133.

It is preferred that each rectangular radial valve entrance port 136 in the present embodiment be oriented such that a radius drawn from the axis of the entrance plate 130 would bisect the radial valve entrance port 136 in perpendicular fashion with respect to the edges of the rectangular radial valve entrance port 136. This being the case, each rectangular radial valve entrance port 136 in the present embodiment can be said to have a length and a width, the length being taken to be in the direction of this bisecting radius, and the width being taken to be in a direction perpendicular to this length. Furthermore, in the present embodiment, the distance of each radial valve entrance port 136 from the axis of the entrance plate 130 is characterized by a radial valve entrance port torque moment arm 135, this radial valve entrance port torque moment arm 135 here being taken for convenience to be the distance from the plate axis to the point at which this bisecting radius intersects the outer edge of the radial valve entrance port 136, even though this need not necessarily represent the outermost location where fluid exits the radial valves. Note that the term "torque moment arm" is used notwithstanding the fact that the radial valves in the present embodiment serve as non-torque-producing valves. For example, in one embodiment, the radial valve entrance ports 136 might each have a nominal length of 0.344 inch, a nominal width of 0.188 inch, and an actual radial valve entrance port torque moment arm 135 of 0.667 inch. Note that what are referred to here as nominal values are values of dimensions measured to the edge of the radial valve closure member 146 (FIG. 8) that seals against the radial valve entrance port 136 rather than to the edge of the radial valve entrance port 136 itself. That nominal values differ from actual values by the width of the valve seat, as will be described in more detail below. Like dimensions of corresponding features associated with the radial valves in the other plates 140, 150, 162 are defined similarly.

It is preferred that each arcuate circumferential valve entrance port 133 in the present embodiment be oriented in concentric fashion with respect to the axis of the entrance plate 130. This being the case, each arcuate circumferential valve entrance port 133 in the present embodiment can be said to have a length and a width, the length being taken to be the dimension along an arc going through the midline of the circumferential valve entrance port 133, and the width being taken to be the dimension of the circumferential valve entrance port 133 in the radial direction. Furthermore, in the present embodiment, the distance of each circumferential valve entrance port 133 from the axis of the entrance plate 130 is characterized by a circumferential valve entrance port torque moment arm 134, this circumferential valve entrance port torque moment arm 134 here being taken for convenience to be the distance from the plate axis to the outer edge of the circumferential valve entrance port 133, even though this need not necessarily represent the outermost location where fluid exits the circumferential valves. Note that the term "torque moment arm" as applied to the circumferential valves is particularly appropriate, since, as explained above, the circumferential valves in the present embodiment serve as torque-producing valves. For example, in one embodiment, the circumferential valve entrance ports 133 might each have a nominal length of 0.474 inch, a nominal width of 0.188 inch, and an actual circumferential valve entrance port torque moment arm 134 of 0.683 inch. Note that what are referred to here as nominal values are values of dimensions measured to the edge of the circumferential valve closure member 143 (FIG. 8) that seals against the circumferential valve entrance port 133 rather than to the edge of the circumferential valve entrance port 133 itself. That is, nominal values differ from actual values by the width of the valve seat, as will be described in more detail below. Like dimensions of corresponding features associated with the circumferential valves in the other plates 140, 150, 162 are defined similarly.

In the present embodiment, the circumferential valve entrance ports 133 (and thus the circumferential valves) and the radial valve entrance ports 136 (and thus the radial valves) are arranged in alternating fashion circumferentially about the axis of rotation of the turbine. In the present embodiment, it is preferred that the circumferential valve entrance ports 133 not be located at angular positions exactly midway between radial valve entrance ports 136 but instead be located at angular positions rotated counterclockwise by some amount from angular positions midway between radial valve entrance ports 136 as viewed from the downstream side. For example, in an embodiment in which the nominal arc length of the circumferential valve entrance port 133 subtends an angle of 45 degrees, the midpoint in the circumferential direction of the circumferential valve entrance port 133 would preferably not be located at an angular position exactly midway between the centerlines of the neighboring radial valve entrance ports 136, but might instead preferably be located at an angular position rotated approximately, for example, 2.5 degrees counterclockwise from an angular position midway between those neighboring radial valve entrance ports 136 as viewed from the downstream side. As will become clear below, this allows room for conduit-like features for guiding flow of fluid that has passed through the circumferential valves. That is, each circumferential valve entrance port 133 in the embodiment shown in FIG. 7 has a nominal arc length of 45 degrees, the counterclockwise-most edge thereof making a nominal circumferential valve nonconduit-side angle 132 of 20 degrees with the centerline of the radial valve entrance port 136 on its counterclockwise side, and the clockwise-most edge thereof making a nominal circumferential valve conduit-side angle 138 of 25 degrees with the centerline of the radial valve entrance port 136 on its clockwise side, as viewed from the downstream side thereof.

Note that what are referred to here as nominal values are values of dimensions measured to the edge of the circumferential valve closure member 143 that seals against the circumferential valve entrance port 133 rather than to the edge of the circumferential valve entrance port 133 itself. That is, nominal values differ from actual values by the width of the valve seat, the width of this valve seat being the amount of a closure member interference 139. In a preferred embodiment, this closure member interference 139 might be 0.020 inch on all four sides of each circumferential valve. This being the case, the actual angle subtended by the circumferential valve entrance port 133 in the present embodiment will be reduced due to this closure member interference 139 by 0.040 inch relative to the nominal value given above therefor. Accordingly, the actual length of the circumferential valve entrance port 133 will be smaller than the nominal value given above by 0.040 inch. Moreover, the actual width of the circumferential valve entrance port 133 will be smaller than the nominal value given above by 0.040 inch. Below, at the description of the closure plate 140 given with reference to FIG. 8, exemplary specific values for length, width, and torque moment arm of the entrance ports 133, 136 and the closure members 143, 146 at the circumferential valves and the radial valves are compared based on the exemplary specific value of 0.020 inch given above for this closure member interference 139.

Figure 8:
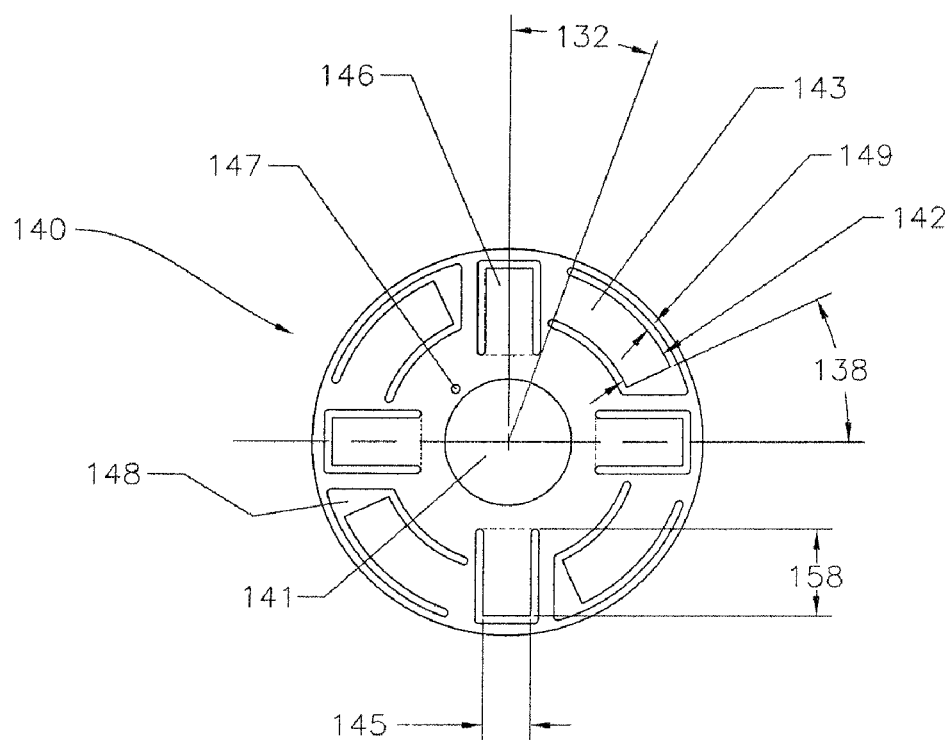
FIG. 8 is a rear view, as seen from the downstream direction, of the closure plate of the turbine subassembly shown in FIGS. 3 and 4.

As can be seen by comparison with FIG. 8, as well as by referring to the portion of the circumferential valve shown in cutaway fashion at upper right in FIG. 4, this closure member interference 139 is the amount of interference between the circumferential valve closure member 143 and the circumferential valve entrance port 133, as viewed in the axial direction, when the circumferential valve is in its closed configuration. That is, this closure member interference 139 is the amount by which the edges of the circumferential valve closure member 143 extend beyond the edges of the circumferential valve entrance port 133, as viewed in the axial direction, when the circumferential valve is in its closed configuration. This closure member interference 139 represents the width of the valve seat at the periphery of the circumferential valve entrance port 133 on the downstream side of the entrance plate 130. The circumferential valve closure member 143 seals against this valve seat when in its closed configuration.

In like fashion as with the circumferential valves, each of the radial valves has a valve seat at the periphery of the corresponding radial valve entrance port 136 on the downstream side of the entrance plate 130, the width of this valve seat corresponding to this closure member interference 139. In a preferred embodiment, this closure member interference 139 might be 0.020 inch on all four sides of each radial valve. The radial valve closure member 146 seals against this valve seat when in its closed configuration. In like fashion as with the circumferential valves, in a preferred embodiment, the actual length and width of the radial valve entrance port 136 will each be smaller than the nominal values given above by 0.040 inch due to this closure member interference 139.

Referring to FIG. 8, this is a rear view, as seen from the downstream direction, of the closure plate 140. The closure plate 140 serves as a closure layer and is located immediately downstream from the entrance plate 130 in the laminated bypass valve structure shown in FIGS. 3 and 4.

In addition to the closure plate central hole 141 and the closure plate alignment hole 147, the purposes of which were explained above in the description given with reference to FIG. 3, the closure plate 140 has closure members 143, 146 corresponding generally in size and location to the sizes and locations of the entrance ports 133, 136 of the entrance plate 130, except for the closure member interference 139, this being the amount by which the edges of the closure members 143, 146 extend beyond the edges of the entrance ports 133, 136 as viewed in the axial direction. That is, in the present embodiment, there are four circumferential valve closure members 143 and four radial valve closure members 146 respectively corresponding to the four circumferential valve entrance ports 133 and the four radial valve entrance ports 136, the closure members 143, 146 being arranged so as to cooperate with the entrance ports 133, 136 to form bypass valves having valve seat width equal to this closure member interference 139.

In the embodiment shown at FIG. 8, presence of three-sided cutouts at each of eight locations on the closure plate 140 results in formation of eight cantilever-like closure members 143, 146. Each cantilever-like closure member 143, 146 has a proximal end, also referred to as its base, at its point of attachment to the closure plate 140. Furthermore, each cantilever-like closure member 143, 146 has a distal end, also referred to as its tip, opposite its proximal end. The closure members 143, 146 in the present embodiment thus constitute cantilever-like springs, the restoring force of which allows the closure members 143, 146 to act as variable-resistance bypass valves permitting increased diversion of flow away from the turbine jets 129 with increasing flow into the shroud inlet 125. Such partial diversion of flow from the turbine jets 129 to the bypass valves permits regulation of pressure and/or rotational velocity. Moreover, to the extent that the (primary) circumferential valves in the present embodiment are torque-producing valves capable of applying a rotational torque in the same direction as the direction of the torque from the jets 129 of the turbine shroud 120, this is also effective in ensuring that there will be sufficient rotational torque to keep the turbine subassembly 115 rotating in the rotational direction over a reasonably wide range of rates of flow of fluid through the mass flowmeter 100 despite application on the turbine subassembly 115 of a counterrotational torque that increases in magnitude as the secondary circumferential valves, described below, open to an increasing extent in at least one flow rate domain.

The closure plate 140 has an upstream side and a downstream side. When fluid pressure at the upstream side of a closure member 143, 146 causes that closure member 143, 146 to deflect and open, fluid is able to enter from the upstream side thereof and pass through to the downstream side thereof.

The closure member cutout width 149—in other words, the width of the cutout on each of three sides of each closure member 143, 146—may be any suitable width, but is here shown for convenience as being everywhere the same, this here being taken to be on the order of 0.031 inch, except at the tip (distal portion) of each of the circumferential valve closure members 143, where this cutout region is enlarged to form a wedge-shaped closure plate circumferential valve conduit-side clearance passage 148. Although shown as wedge-shaped in the present embodiment, any suitable shape may be employed for the closure plate circumferential valve conduit-side clearance passage 148. It is preferred, however, where desired for formation of suitable conduit passages for torque-producing flow, that the closure plate circumferential valve conduit-side clearance passages 148 be such as to allow at least a portion of the fluid to pass therethrough relatively unimpeded as it is guided to the vicinity of the circumferential valve intermediary passage conduit slope 154 described below. In the present embodiment, for example, the nonconduit side (counterclockwise-most edge) of this wedge-shaped closure plate circumferential valve conduit-side clearance passage 148, coinciding with the distal end of the circumferential valve closure member 143, might make a circumferential valve conduit-side angle 138 of 25 degrees with the centerline of the radial valve closure member 146 (and thus with the centerline of the radial valve entrance port 136) on its clockwise side, as viewed from the downstream side thereof. Furthermore, in the present embodiment, the conduit side (clockwise-most edge) of this wedge-shaped closure plate circumferential valve conduit-side clearance passage 148 might be parallel with and a distance on the order of 0.187 inch from the centerline of the radial valve closure member 146 (and thus from the centerline of the radial valve entrance port 136) on its clockwise side, as viewed from the downstream side thereof.

Notwithstanding this preferred presence of closure plate circumferential valve conduit-side clearance passages 148 in some embodiments, in other embodiments of the present invention there may be no closure plate circumferential valve conduit-side clearance passage 148. That is, what is meant by a circumferential valve having no closure plate circumferential valve conduit-side clearance passage 148 is that the width of the cutout at the tip (distal portion) of such a circumferential valve closure member 143 would be on the same order as the closure member cutout width 149 at the other three sides of that circumferential valve closure member 143, in similar fashion as at the tips (distal portions) of the radial valve closure members 146 in the embodiment shown in FIG. 8.

There is no particular limitation with respect to material or thickness of the closure plate 140, but as one example, full-hard precision stainless steel (such as CRES AISI Type 302 of hardness 40-45 Rc) of thickness 0.005 inch, having surface passivation treatment in accordance with MIL-S-5002, might be employed. Material and thickness of the closure plate 140, and dimensions of the closure members 143, 146, should be chosen to allow the bypass valves formed by combination of the entrance ports 133, 136 and the closure members 143, 146 to perform as desired for regulation of pressure and/or rotational velocity. In particular, dimensions at the closure plate 140 should be chosen so as to permit each of the closure members 143, 146 to deflect with a spring force as appropriate for regulation in response to application of fluid pressure thereto over the effective surface area of the entrance ports 133, 136.

Each of the closure members 143, 146 has a length, width, and torque moment arm, these being defined by analogy with the corresponding dimensions of the entrance ports 133, 136 given above. That is, each radial valve closure member 146 has a radial valve closure member length 158, a radial valve closure member width 145, and a radial valve closure member torque moment arm, these being slightly larger than the corresponding dimensions at the radial valve entrance ports 136 due to presence of the closure member interference 139 serving as valve seat. Furthermore, each circumferential valve closure member 143 has a circumferential valve closure member length, a circumferential valve closure member width 142, and a circumferential valve closure member torque moment arm, these being slightly larger than the corresponding dimensions at the circumferential valve entrance ports 133 due to presence of the closure member interference 139 serving as valve seat.

As has been described, nominal values for various radial and circumferential valve dimensions were given above during description of the entrance plate 130 with reference to FIG. 7, with actual dimensions of the entrance ports 133, 136 being adjusted relative thereto so as to cause the entrance ports 133, 136 to be smaller in length and in width than these nominal values, thus permitting creation of a valve seat of width in the amount of the closure member interference 139 at the periphery on the downstream side of each entrance port 133, 136. By giving the closure members 143, 146 in the present embodiment actual dimensions equal to these nominal values, contact (or minimal separation) between the closure members 143, 146 and the entrance ports 133, 136 will result in formation of a valve seat of width equal to the closure member interference 139. That is, when the bypass valves formed by combination of the closure members 143, 146 and the entrance ports 133, 136 are in their closed configuration, such that the upstream surfaces of the closure members 143, 146 press against or lie adjacent to the downstream surfaces of the entrance ports 133, 136, this valve seat of width equal to the closure member interference 139 represents the locus of contact or minimal separation between the closure members 143, 146 and the entrance ports 133, 136. It is by virtue of this contact or minimal separation that the bypass valves formed by combination of the closure members 143, 146 and the entrance ports 133, 136 are able to seal against, or present maximal fluid resistance to, flow of fluid therethrough when in their closed configuration.

Specifically, in the present embodiment, if each radial valve entrance port 136 has a nominal length of 0.344 inch and a nominal width of 0.188 inch, the radial valve closure members 146 will each have an actual length and width respectively equal to these nominal values, but the radial valve entrance ports 136 will each have an actual length of 0.304 inch and an actual width of 0.148 inch. Furthermore, whereas the actual radial valve entrance port torque moment arm 135 in the present embodiment was above said to be 0.667 inch, the actual torque moment arm of the radial valve closure member 146 in the present embodiment will be 0.687 inch. Similarly, in the present embodiment, if each circumferential valve entrance port 133 has a nominal length of 0.478 inch and a nominal width of 0.188 inch, the circumferential valve closure members 143 will each have an actual length and width respectively equal to these nominal values, but the circumferential valve entrance ports 133 will each have an actual length of 0.438 inch and an actual width of 0.148 inch. Furthermore, whereas the actual circumferential valve entrance port torque moment arm 134 in the present embodiment was above said to be 0.683 inch, the actual torque moment arm of the circumferential valve closure member 143 in the present embodiment will be 0.703 inch.

That is, in the present embodiment, all closure members 143, 146 seal against their respective entrance ports 133, 136 to produce a closure member interference 139 of 0.020 inch serving as valve seat. This general relationship between the entrance ports 133, 136 of the entrance plate 130 and the closure members 143, 146 of the closure plate 140 can be seen by referring to the portion of the circumferential valve shown in cutaway fashion at upper right in FIG. 4. Although not shown in FIG. 4, the relationship between the radial valve entrance ports 136 and the radial valve closure members 146 is similar to the relationship between the circumferential valve entrance ports 133 and the circumferential valve closure members 143 shown in FIG. 4. Although the general relationship between the entrance ports 133, 136 of the entrance plate 130 and the closure members 143, 146 of the closure plate 140 is only shown for one portion of one circumferential valve, in the present embodiment it is nonetheless the case that all closure members 143, 146 seal against their respective entrance ports 133, 136 to produce a closure member interference 139 about the periphery at the downstream side of the entrance ports 133, 136, this closure member interference 139 here being taken to be on the order of 0.020 inch on all sides of the radial valves and circumferential valves.

In accordance with the present invention, the upstream side of one or more of the closure members 143, 146 may be preloaded against the downstream side of the corresponding entrance port or ports 133, 136. Where such preloading of closure members 143, 146 against entrance ports 133, 136 is carried out, it is preferred that it be done in symmetric and/or balanced fashion so that regulation does not adversely impact dynamic stability of the mass flowmeter 100.

For example, in the present embodiment, the radial valves are preloaded but the (primary) circumferential valves are not. That is, as indicated by dashed line at the location of a bend at the proximal end (base) of each of the radial valve closure members 146 shown in FIG. 8, following assembly into the laminated bypass valve structure of the turbine subassembly 115 of the present embodiment, the upstream side of each of the radial valve closure members 146 will be preloaded against the valve seat at the periphery of the corresponding radial valve entrance port 136 on the downstream side of the entrance plate 130. The direction of this bend at the base of each radial valve closure member 146 is therefore such as to cause the tip of the radial valve closure member 146 to extend upstream from the plane of the closure plate 140. In contrast, each of the circumferential valve closure members 143 in the embodiment shown in FIG. 8 is not preloaded against the valve seat at the periphery of the corresponding circumferential valve entrance port 133 on the downstream side of the entrance plate 130 but instead merely rests flush thereagainst.

Figure 9:
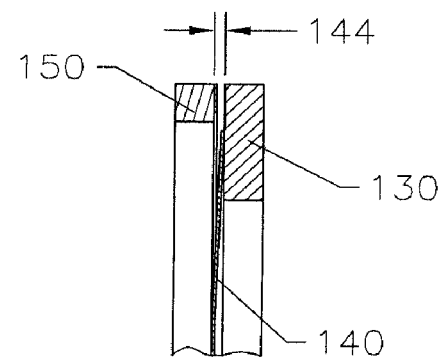
FIG. 9 is a side sectional view of section B-B indicated in FIG. 4, showing preloading of a radial valve closure member against a radial valve entrance port.

This preloading of the radial valve closure members 146 against the corresponding radial valve entrance ports 136 in the present embodiment is shown in more detail in FIG. 9. At FIG. 9, the entrance plate 130, closure plate 140, and intermediary plate 150 are shown at a point in time during assembly when the plates 130, 140, 150, 162 making up the turbine subassembly 115 are stacked such that the entrance plate 130 and the intermediary plate 150 have each respectively just made contact with the closure plate 140 that is sandwiched therebetween but the radial valve closure members 146 of the closure plate 140, bent at their bases for preloading, are as yet undeflected from their neutral positions. At this time, there might be an undeflected closure member interplate gap 144 of, for example, 0.017 inch between the downstream side of the entrance plate 130 and the upstream side of the intermediary plate 150. As assembly proceeds, and the entrance plate 130 and the intermediary plate 150 are made to compress the closure plate 140 therebetween, the tip of each radial valve closure member 146 will be deflected by a total distance corresponding to the undeflected closure member interplate gap 144 less the thickness of the closure plate 140, preloading the upstream side of each radial valve closure member 146 against the downstream side of its corresponding radial valve entrance port 136. The magnitude of this preload at the distal end of the cantilever-like radial valve closure member 146 will be approximately equal to the undeflected closure member interplate gap 144 less the thickness of the closure plate 140 times the spring constant of the cantilever-like radial valve closure member 146.

Figure 10:
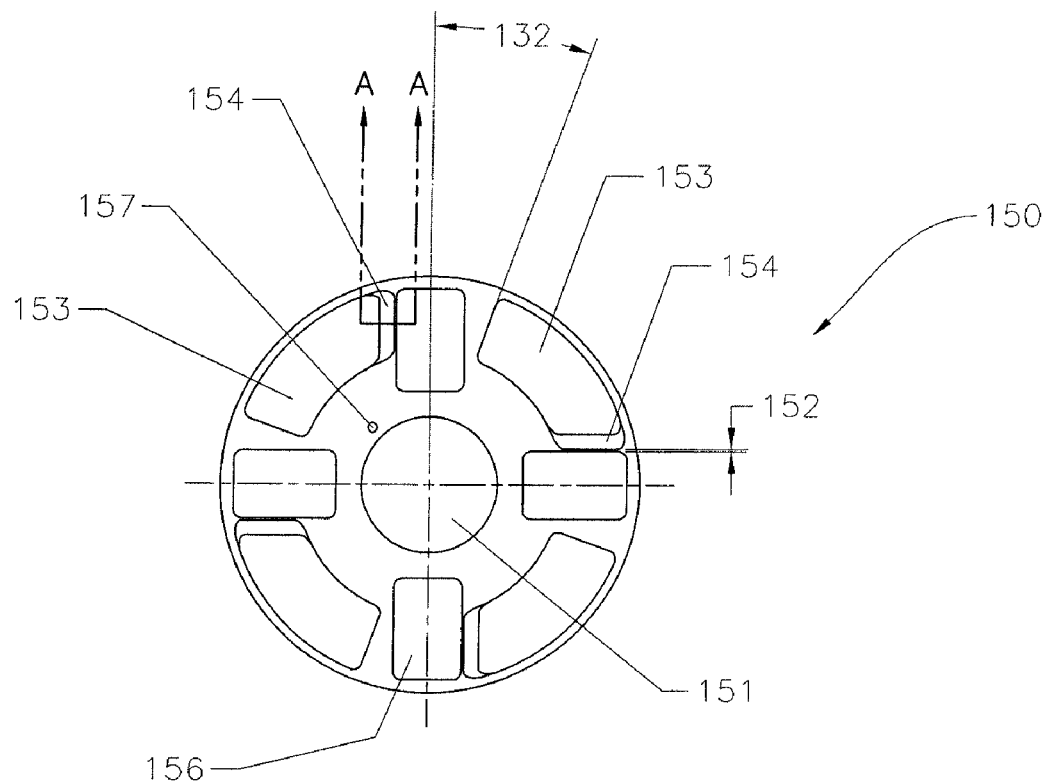
FIG. 10 is a rear view, as seen from the downstream direction, of the intermediary plate of the turbine subassembly shown in FIGS. 3 and 4.

Referring to FIG. 10, this is a rear view, as seen from the downstream direction, of the intermediary plate 150. The intermediary plate 150 serves as an intermediary layer and is located immediately downstream from the closure plate 140 in the laminated bypass valve structure shown in FIGS. 3 and 4.

In addition to the intermediary plate central hole 151 and the intermediary plate alignment hole 157, the purposes of which were explained above in the description given with reference to FIG. 3, the intermediary plate 150 has eight intermediary passages 153, 156 corresponding generally in size and location to the sizes and locations of the entrance ports 133, 136 of the entrance plate 130 (and thus to the closure members 143, 146 of the closure plate 140), except as noted below. That is, the intermediary plate 150 in the present embodiment has four radial valve intermediary passages 156 corresponding to the four radial valve entrance ports 136 of the entrance plate 130 (and thus to the four radial valve closure members 146 of the closure plate 140), and has four circumferential valve intermediary passages 153 corresponding to the four circumferential valve entrance ports 133 of the entrance plate 130 (and thus to the four circumferential valve closure members 143 of the closure plate 140).

In the present embodiment, the conduit side of each circumferential valve intermediary passage 153 is the clockwise-most edge, and the nonconduit side of each circumferential valve intermediary passage 153 is the counterclockwise-most edge, as viewed from the downstream side thereof.

Except for presence of a circumferential valve intermediary passage conduit slope 154, described below, at the conduit side of each of the circumferential valve intermediary passages 153, the intermediary passages 153, 156 in the present embodiment might simply be through-holes. There is no particular limitation with respect to material or thickness of the intermediary plate 150, but as one example, full-hard precision stainless steel (such as CRES AISI Type 302 of hardness 40-45 Rc) of thickness 0.031 inch, having surface passivation treatment in accordance with MIL-S-5002, might be employed.

The intermediary plate 150 has an upstream side and a downstream side. Each intermediary passage 153, 156 in the intermediary plate 150 allows fluid to enter from the upstream side thereof and exit from the downstream side thereof. The radial valve intermediary passages 156 allow passage therethrough of fluid arriving from the radial valve entrance ports 136 by way of the radial valve closure members 146. The circumferential valve intermediary passages 153 allow passage therethrough of fluid arriving from the circumferential valve entrance ports 133 by way of the circumferential valve closure members 143. Each intermediary passage 153, 156 also has clearance to allow unimpeded movement of the closure member 143, 146 immediately upstream therefrom as well as flow of fluid arriving by way of that closure member 143, 146. This clearance can be partially seen at FIGS. 4 and 9, where, as can be noted by comparing FIGS. 8 and 10, the perimeters of the circumferential valve intermediary passages 153 and the radial valve intermediary passages 156 substantially correspond to the perimeters of the cutouts of width 149 at the closure plate 140 in the present embodiment.

Moreover, in the present embodiment, there is a circumferential valve intermediary passage conduit slope 154 at the conduit side (clockwise side as viewed from the downstream direction in the present embodiment) of each circumferential valve intermediary passage 153. The intermediary passages 153, 156 cooperate with the entrance ports 133, 136 and the closure members 143, 146 upstream therefrom, and with various features of the exit plate subassembly 160 downstream therefrom, to direct and guide fluid passing therethrough. In particular, the circumferential valve intermediary passage conduit slope 154 in some embodiments may cooperate with the closure plate circumferential valve conduit-side clearance passage 148 of the closure plate 140, and with the circumferential valve closure member 143 itself, to form a conduit-like passage for guiding flow of fluid that exits the turbine subassembly 115 by way of circumferential valve sloped exit passage 178 (FIG. 16) at each of the circumferential valves. That is, when a (primary) circumferential valve is open, fluid not exiting the turbine subassembly 115 by way of a secondary circumferential valve, described below, may be guided by the surface of the deflected circumferential valve closure member 143 as that fluid passes through conduit-like features including the closure plate circumferential valve conduit-side clearance passage 148 of the closure plate 140 to exit the turbine subassembly 115 by way of a circumferential valve sloped exit passage 178 (FIG. 16) formed by cooperation between the circumferential valve intermediary passage conduit slope 154 of the intermediary plate 150 and a conduit-side cutout 168 of the exit plate 162, described below. Moreover, the circumferential valve closure member 143 at each of the circumferential valves in the present embodiment may deflect in such a way that, when the circumferential valve is open, the circumferential valve closure member 143 is brought into alignment with the circumferential valve intermediary passage conduit slope 154.

Figure 11:
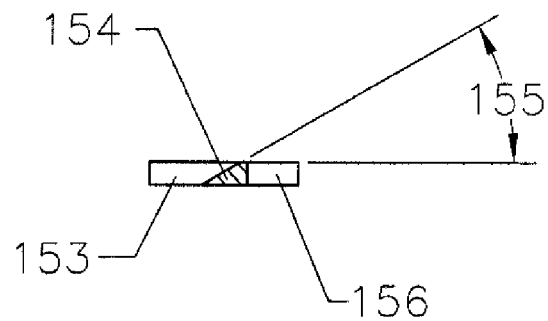
FIG. 11 is a side sectional view of section A-A of the intermediary plate indicated in FIG. 10.

Referring to FIG. 11, this shows a side sectional view of section A-A indicated in FIG. 10, the location of section A-A being chosen to go through a circumferential valve intermediary passage conduit slope 154 at the conduit side of one of the circumferential valve intermediary passages 153. At FIG. 11, the upstream side of the intermediary plate 150 appears at the bottom in the drawing, and the downstream side of the intermediary plate 150 appears at the top in the drawing. As shown in FIG. 11, the circumferential valve intermediary passage conduit slope 154 makes a circumferential valve intermediary passage conduit slope angle 155 of, for example, 30 degrees with the surface at the upstream side of the intermediary plate 150, and thus with a plane perpendicular to the axis of rotation of the turbine subassembly 115, such that fluid directed thereto by the deflected circumferential valve closure member 143 may be smoothly guided out the circumferential valve sloped exit passage 178 (FIG. 16) formed by cooperation between this circumferential valve intermediary passage conduit slope 154 and a conduit-side cutout 168 in the exit plate 162, described below. Although the present embodiment employs a circumferential valve intermediary passage conduit slope angle 155 of 30 degrees, in other embodiments a circumferential valve intermediary passage conduit slope angle 155 of between 15 and 45 degrees might be employed, and there is no particular objection to employment of angles or ranges of angles different from those mentioned by way of example here. As can be seen at FIGS. 10 and 11, a circumferential valve intermediary passage conduit slope 154 is present at an inside surface on the clockwise-most side, as viewed from the downstream direction, of each circumferential valve intermediary passage 153. Moreover, this circumferential valve intermediary passage conduit slope 154 is sloped in a direction facilitating smooth exit of fluid from the circumferential valve sloped exit passage 178 (FIG. 16) in a generally circumferential direction with respect to the axis of rotation of the turbine subassembly 115. That is, fluid exiting from the circumferential valve sloped exit passage 178 (FIG. 16) has at least a component of motion in the circumferential direction.

Returning to FIG. 10, as viewed in the axial direction from the downstream side, this circumferential valve intermediary passage conduit slope 154 might, at the upstream side of the intermediary plate 150, be parallel with and a distance on the order of 0.195 inch from the centerline of the radial valve on its clockwise side, and might emerge so as to be parallel with and a distance on the order of 0.133 inch from the centerline of the radial valve on its clockwise side, based on the exemplary value of 30 degrees for the circumferential valve intermediary passage conduit slope angle 155 and the exemplary thickness of 0.031 inch given above for the intermediary plate 150. That is, the circumferential valve intermediary passage conduit slope 154 is sloped such that its upstream side is closer to the distal end of the circumferential valve closure member 143 immediately upstream therefrom than its downstream side is. If the width of the radial valve intermediary passage 156 is 0.250 inch, this means that at the downstream side of the intermediary plate 150 there would be a clearance or intervalve transition distance 152 of 0.008 inch between the clockwise-most edge of the circumferential valve intermediary passage conduit slope 154 and the counterclockwise-most edge of the radial valve intermediary passage 156 of the radial valve on the clockwise side thereof, as viewed from the downstream direction.

In the present embodiment, each of the intermediary passages 153, 156 has a length, width, and torque moment arm, these being defined by analogy with the corresponding dimensions of the entrance ports 133, 136 and/or closure members 143, 146 given above. Specifically, based on the exemplary values given above, each radial valve intermediary passage 156 might have a length of 0.375 inch, a width of 0.250 inch, and a torque moment arm of 0.718 inch. Furthermore, each circumferential valve intermediary passage 153 might have a width of 0.250 and a torque moment arm of 0.734 inch.

Calculation of an exemplary value for the length of each circumferential valve intermediary passage 153 in the present embodiment is complicated by the fact that presence of conduit-like features on the conduit side (clockwise side as viewed from the downstream direction) of the circumferential valve intermediary passage 153 causes the circumferential valve intermediary passage 153 in the present embodiment to deviate from arcuate shape. That is, each circumferential valve intermediary passage 153 in the present embodiment is generally arcuate as viewed in the axial direction, except that the circumferential valve intermediary passage conduit slope 154 at the clockwise-most edge of each circumferential valve intermediary passage 153, as viewed from the downstream side of the intermediary plate 150, does not lie along a radius of the intermediary plate 150 but is rather parallel with and a distance on the order of 0.195 inch from the centerline of the radial valve on its clockwise side on the upstream side of the intermediary plate 150, and is parallel with and on the order of a distance of 0.133 inch from the centerline of the radial valve on its clockwise side on the downstream side of the intermediary plate 150.

In the present embodiment, the counterclockwise-most edge of each circumferential valve intermediary passage 153 might make a circumferential valve nonconduit-side angle 132 of 20 degrees with the centerline of the radial valve on its counterclockwise side (this circumferential valve nonconduit-side angle 132 here being taken to be of the same or similar magnitude as the circumferential valve nonconduit-side angle 132 at the circumferential valve entrance port 133 shown in FIG. 7 and the circumferential valve closure member 143 shown in FIG. 8, the same reference numeral 132 is in the present embodiment used for each). Furthermore, using the 0.133 inch distance from the circumferential valve intermediary passage conduit slope 154 at the downstream side of the intermediary plate 150 to the centerline of the radial valve at the clockwise side of that circumferential valve, an effective angle of 12.6 degrees from the midline of the clockwise-most edge of the circumferential valve intermediary passage 153 to the centerline of the radial valve on the clockwise side thereof as viewed from the downstream side can be calculated. Based on a circumferential valve nonconduit-side angle 132 of 20 degrees, and this conduit-side angle of 12.6 degrees, at the downstream side of the intermediary plate 150, the effective arc length of the circumferential valve intermediary passage 153 is taken to be 57.4 degrees, or 0.610 inch at its midline, in the present embodiment.

Figure 12:
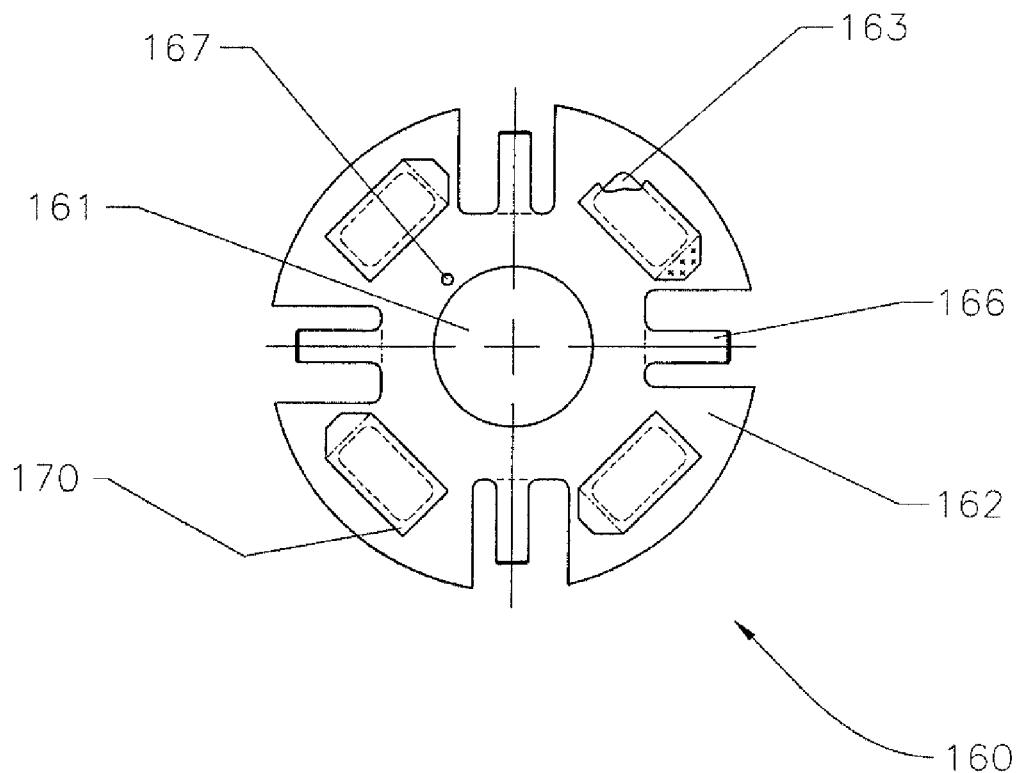
FIG. 12 is a rear view, as seen from the downstream direction, of the exit plate subassembly of the turbine subassembly shown in FIGS. 3 and 4, the secondary circumferential valve closure member in the upper right quadrant of the drawing being shown in cutaway fashion to reveal the secondary circumferential valve port.

Referring to FIG. 12, this is a rear view, as seen from the downstream direction, of the exit plate subassembly 160. The exit plate subassembly 160 includes an exit plate 162, and also includes a plurality of secondary circumferential valve closure members 170 that are attached, for example by spot-welding, to the exit plate 162 (exemplary locations of such spot-welding are indicated at the secondary circumferential valve closure member 170 shown in the upper right quadrant at FIG. 12, but locations of such spot welding are for clarity not indicated at the remaining secondary circumferential valve closure members 170 shown in FIG. 12). The exit plate subassembly 160 serves as an exit layer, the exit plate 162 of the exit plate subassembly 160 being the downstream-most plate among the plates 130, 140, 150, 162 making up the laminated bypass valve structure shown in FIGS. 3 and 4. The exit plate subassembly 160 in the present embodiment is therefore disposed downstream of the closure plate 140, with the intermediary plate 150 intervening therebetween. That is, the intermediary plate 150 in the present embodiment is downstream of the closure plate 140 and upstream of the exit plate subassembly 160.

Figure 13:
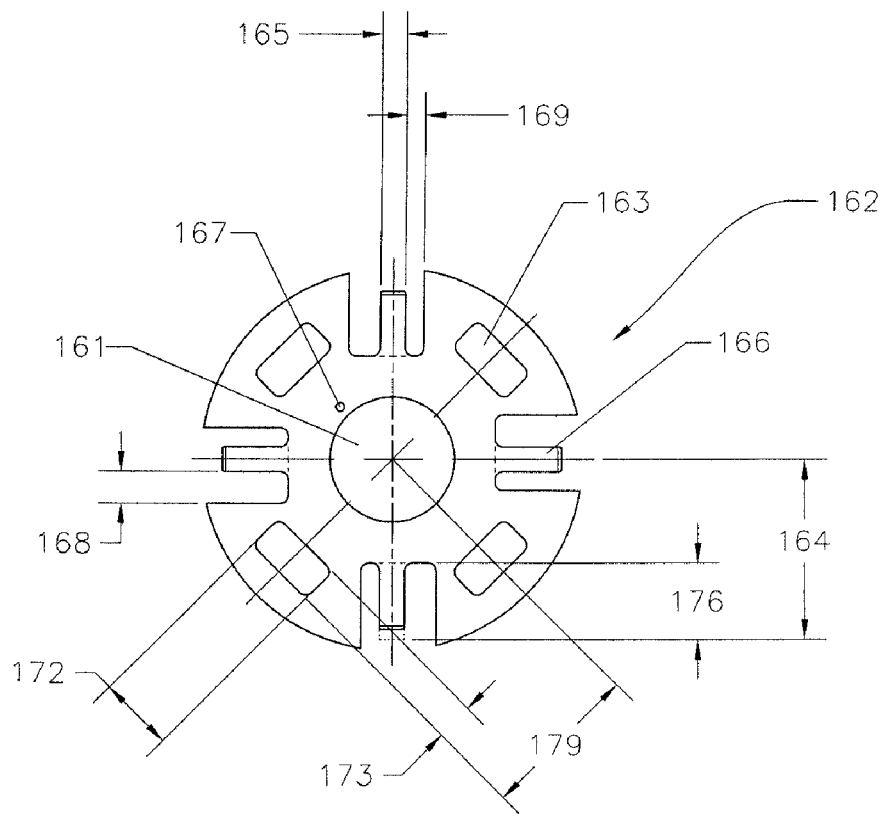
FIG. 13 is a rear view, as seen from the downstream direction, of the exit plate of the exit plate subassembly shown in FIG. 12.

FIG. 13 is a rear view, as seen from the downstream direction, of the exit plate 162 of the exit plate subassembly 160. In addition to the exit plate central hole 161 and the exit plate alignment hole 167, the purposes of which were explained above in the description given with reference to FIG. 3, the exit plate 162 in the present embodiment has a set of four secondary circumferential valve ports 163. In the present embodiment, the four secondary circumferential valve ports 163 are arranged at uniform angular pitch so as to be 90 degrees apart.

In the present embodiment, these secondary circumferential valve ports 163 might simply be through-holes. There is no particular limitation with respect to material or thickness of the exit plate 162, but as one example, full-hard precision stainless steel (such as CRES AISI Type 302 of hardness 40-45 Rc) of thickness 0.010 inch, having surface passivation treatment in accordance with MIL-S-5002, might be employed.

The exit plate 162 has an upstream side and a downstream side. Each secondary circumferential valve port 163 in the exit plate 162 allows fluid to enter from the upstream side thereof. The periphery on the downstream side of each secondary circumferential valve port 163 defines a valve seat against which each of the secondary circumferential valve closure members 170, described below, can seal.

The exit plate 162 in the present embodiment also has four fingers 166, each of which is defined by a finger conduit-side cutout 168 and a finger nonconduit-side cutout 169. At FIG. 13, these cutouts 168, 169 have for convenience been indicated by their respective widths, cutout length dimensions being determined by the lengths of the fingers 166 and the radius of the exit plate 162. Although reference numerals 168 and 169 have for convenience been used at FIG. 13 to indicate the respective widths of the finger conduit-side cutout 168 and the finger nonconduit-side cutout 169, exemplary dimensions for which are given below, note that reference numerals 168 and 169 are generally used throughout this document to refer to the cutouts 168, 169 themselves, without limitation to the widths of those cutouts 168, 169.

Each finger 166 has a proximal end, also referred to as its base, at its point of attachment to the exit plate 162. Furthermore, each finger 166 has a distal end, also referred to as its tip, opposite its proximal end. As can be seen in FIG. 3, these fingers 166 of the exit plate 162 are bent at their bases as indicated in dashed line at FIG. 13 by a finger bend angle 171 of, for example, 45 degrees, in a direction causing their tips to extend downstream from the plane of the exit plate 162. The unbent length 176 of one of the fingers 166 is shown for reference in dotted line at the bottom in FIG. 13. Each finger 166 has a length 176, width 165, and torque moment arm 164, these being defined by analogy with dimensions of similar features given above. In the present embodiment, exemplary values for the (unbent) finger length 176, finger width 165, and (unbent) finger torque moment arm 164 might respectively be 0.305 inch, 0.100 inch, and 0.718 inch. In the present embodiment, the four fingers 166 are aligned with the four radial valve entrance ports 136 such that the centerline of each finger 166 coincides with the centerline of a corresponding radial valve entrance port 136 as viewed in the axial direction.

One purpose of these fingers 166 is to restrict and/or prevent excessive deflection of the radial valve closure members 146. Moreover, the conduit-side cutout 168 and the nonconduit-side cutout 169 to either side of each finger 166 allow passage therethrough of fluid that has exited the corresponding radial valve. In addition, in the present embodiment, the counterclockwise-most edge (as viewed from the downstream direction) of each conduit-side cutout 168 cooperates with the circumferential valve intermediary passage conduit slope 154 of the intermediary plate 150 to form a circumferential valve sloped exit passage 178, which can be seen in FIG. 16. These circumferential valve sloped exit passages 178 allow passage therethrough of fluid that has passed through the primary circumferential valves but does not exit the turbine subassembly 115 by way of the secondary circumferential valves. In the present embodiment, the conduit-side cutout 168 is therefore wider than the nonconduit-side cutout 169. For example, in one embodiment, a finger 166 of width 0.100 inch might be defined by a conduit-side cutout 168 width of 0.127 and a nonconduit-side cutout 169 of width 0.075 inch. In such an embodiment, the counterclockwise-most edge (as viewed from the downstream direction) of the conduit-side cutout 168 will be parallel with and separated by a distance of 0.177 inch from the centerline of the nearest finger 166. If the clockwise-most edge (as viewed from the downstream direction) of the circumferential valve intermediary passage conduit slope 154 is parallel with and separated by a distance of 0.133 inch from the centerline of that finger 166, this will create a circumferential valve sloped exit passage 178 of width (width here referring to the short dimension in the circumferential direction) equal to or approximately equal to 0.044 inch. The circumferential valve sloped exit passage 178 will have a length (length here referring to the long dimension perpendicular to the short dimension) equal to or approximately equal to the width of the corresponding circumferential valve intermediary passage 153, such as 0.250 inch in the present embodiment. The fluid expelled from such a circumferential valve sloped exit passage 178 can be said to engage in jetting to the extent that it is expelled with a velocity component in the circumferential direction.

Some appreciation of the three-dimensional character of the conduit-like passages formed by the laminated bypass valve structure at and downstream from each of the (primary) circumferential valves of the present embodiment can be gained by noting, based on the exemplary values given above, that the midline of the distal end of the circumferential valve closure member 143 (FIG. 4) is a distance of 0.257 inch from the centerline of the radial valve on the clockwise side of the circumferential valve in question as viewed from the downstream side thereof, and the clockwise-most edge of the wedge-shaped closure plate circumferential valve conduit-side clearance passage 148 (FIG. 8) is a distance of 0.187 inch from that radial valve centerline. Furthermore, the circumferential valve intermediary passage conduit slope 154 (FIG. 10) on the upstream side of the intermediary plate 150 is a distance of 0.195 inch from that radial valve centerline, and emerges from the downstream side of the intermediary plate 150 at a distance of 0.133 inch from that radial valve centerline, to form a circumferential valve sloped exit passage 178 (FIG. 16) of width 0.044 inch in cooperation with the edge of the conduit-side cutout 168 (FIG. 13) that is a distance of 0.177 inch from that radial valve centerline.

In the present embodiment, the secondary circumferential valve ports 163 cooperate with corresponding secondary circumferential valve closure members 170 to form four secondary circumferential valves. To facilitate arrangement in symmetric and/or balanced fashion circumferentially about the axis of rotation of the turbine, a plurality (four, in the present embodiment) of secondary circumferential valves may be employed. Although the secondary circumferential valve ports 163, and thus the secondary circumferential valves, are shown as being rectangular in shape, the present invention is not limited thereto, it being possible to employ secondary circumferential valve ports 163, and thus secondary circumferential valves, of a wide variety of shapes. In the present embodiment, the secondary circumferential valves serve as torque-producing valves, meaning that torque is in general applied about the axis of the turbine subassembly 115 as a result of passage of fluid therethrough. One of ordinary skill in the art will appreciate that any of a wide variety of configurations may be employed as torque-producing valves, and thus that any of a wide variety of shapes may be employed as secondary circumferential valve ports 163.

Note that the secondary circumferential valve ports 163 are referred to as being circumferential, or as being arranged circumferentially with respect to the axis of rotation of the turbine, notwithstanding the fact that in the present embodiment they have rectangular shape. That is, the term "circumferential" as applied to valves is not intended to necessarily indicate arcuate shape following the circumference of a circle (as happens to be the shape of the primary circumferential valve entrance ports 133 shown in FIG. 7), but should rather be understood to refer to a valve that tends to cause fluid passing therethrough to be expelled therefrom with a velocity component in the circumferential direction. For example, although the circumferential valve entrance ports 133, and thus the circumferential valves, are shown as being arcuate in shape at FIG. 7, and the secondary circumferential valve ports 163, and thus the secondary circumferential valves, are shown as being rectangular in shape at FIG. 13, there is no particular objection to employment of one or more rectangular primary circumferential valves or to one or more arcuate secondary circumferential valves. Similarly, the term "radial" (and descriptions of valves arranged radially with respect to the axis of rotation of the turbine) as applied to valves should be understood to refer to a valve that tends to cause fluid passing therethrough to be expelled therefrom substantially radially; that is, substantially without a velocity component in the circumferential direction. Note that since fluid may be expelled in multiple directions simultaneously, for example when expelled in spray-like fashion, where reference is made to velocity components of fluid expelled from any of the various exit passages of the turbine subassembly 115 in connection with jetting or for purposes of determining whether such flow is torque-producing or non-torque-producing, this should be understood to refer to the circumferential and/or radial velocity components of the net flow that is the vector sum of all fluid expelled from that exit passage.

As described above, the exit plate 162 of the present embodiment can be understood to define a plurality of exit passages, these exit passages including the secondary circumferential valve ports 163 of the secondary circumferential valves as well as the circumferential valve sloped exit passages 178 (FIG. 16) formed by cooperation between the conduit-side cutouts 168 and the circumferential valve intermediary passage conduit slopes 154. Moreover, the conduit-side cutout 168 and the nonconduit-side cutout 169 to either side of each finger 166 in the exit plate 162, together with the space therebetween including the passage-like region to the upstream side of each bent finger 166 (FIG. 16), serve as exit passages for the radial valves.

Figure 16:
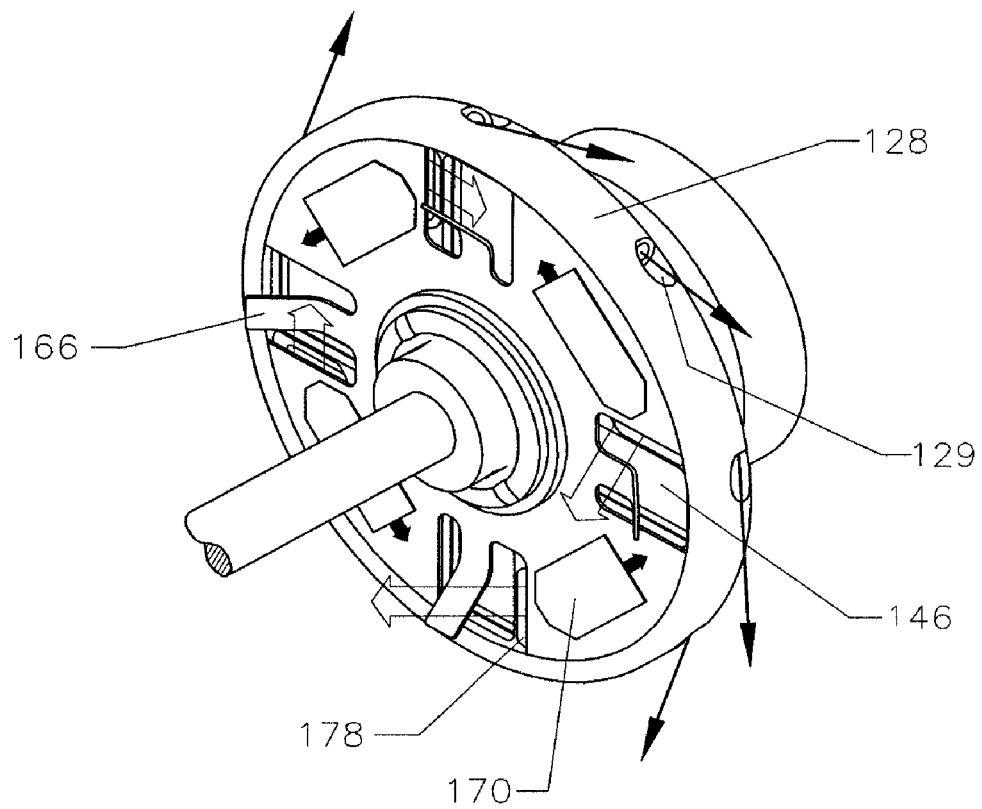
FIG. 16 is a perspective rear view, as seen from the downstream direction, of the turbine subassembly of FIG. 3, showing where torque-producing fluid exits the turbine subassembly.

Note that whereas the term "conduit" has been used up to this point to refer to features including the circumferential valve intermediary passages 153 that facilitate flow of fluid from the (primary) circumferential valve entrance ports 133 to the circumferential valve sloped exit passages 178 (or to the secondary circumferential valves), it should be noted that the radial valve intermediary passage 156 may also be considered to be a conduit-like feature inasmuch as the radial valve intermediary passage 156 facilitates flow of fluid from the radial valve entrance port 136 to where this fluid exits the turbine subassembly 115 by way of the conduit-side cutout 168, the nonconduit-side cutout 169, and the space therebetween including the passage-like region to the upstream side of each bent finger 166 (FIG. 16).

In the present embodiment, the four fingers 166 are aligned with the four radial valve entrance ports 136 of the entrance plate 130 such that the centerline of each finger 166 coincides with the centerline of the corresponding radial valve entrance port 136 as viewed in the axial direction. Looking at FIG. 13, the centerlines of the fingers 166 can therefore be understood to indicate the locations of the centerlines of the radial valve entrance ports 136. In the present embodiment, it is preferred that the secondary circumferential valve ports 163 be located at angular positions midway between fingers 166, which is to say it is preferred that the secondary circumferential valve ports 163 be located at angular positions midway between radial valve entrance ports 136. Since it was said in the description of the entrance plate 130 given with reference to FIG. 7 that it is preferred that the circumferential valve entrance ports 133 be located at angular positions rotated counterclockwise by 2.5 degrees from an angular position midway between radial valve entrance ports 136 as viewed from the downstream side, this means that in such an embodiment the secondary circumferential valve ports 163 will be located at angular positions rotated clockwise by 2.5 degrees relative to the (primary) circumferential valve entrance ports 133.

Moreover, in the present embodiment, it is preferred that each rectangular secondary circumferential valve port 163 be oriented such that a radius drawn from the axis of the exit plate 162 would bisect the secondary circumferential valve port 163 in perpendicular fashion with respect to the edges of the rectangular secondary circumferential valve port 163. This being the case, each rectangular secondary circumferential valve port 163 in the present embodiment can be said to have a length 172 and a width 173, the width 173 being taken to be in the direction of this bisecting radius, and the length 172 being taken to be in a direction perpendicular to this width 173. Furthermore, in the present embodiment, the distance of each secondary circumferential valve port 163 from the axis of the exit plate 162 is characterized by a secondary circumferential valve port torque moment arm 179, this secondary circumferential valve port torque moment arm 179 here being taken for convenience to be the distance from the plate axis to the point at which this bisecting radius intersects the outer edge of the secondary circumferential valve port 163, even though this need not necessarily represent the outermost location where fluid exits the secondary circumferential valves. Like the (primary) circumferential valves described above, the secondary circumferential valves in the present embodiment are torque-producing valves, so use of the term "torque moment arm" is particularly appropriate. For example, in one embodiment, the secondary circumferential valve ports 163 might each have a length 172 of 0.300 inch, a width 173 of 0.150 inch, and a torque moment arm 179 of 0.635 inch. Note that Referring to FIG. 14, this is a rear view, as seen from the downstream direction, of one of the secondary circumferential valve closure members 170, shown before attachment to the exit plate 162. FIG. 15 shows a side view of this secondary circumferential valve closure member 170.

Figure 14:
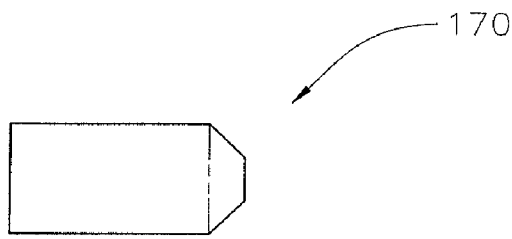
FIG. 14 is a rear view, as seen from the downstream direction, of one of the secondary circumferential valve closure members of the exit plate subassembly shown in FIG. 12, this secondary circumferential valve closure member being shown as it might appear before being spot-welded to the exit plate of FIG. 13.
Figure 15:
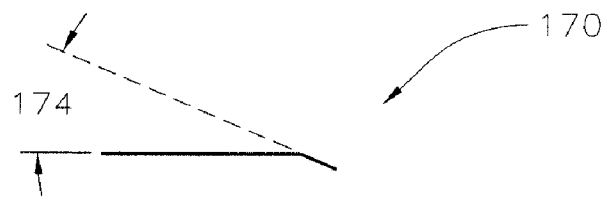
FIG. 15 is a side view of the secondary circumferential valve closure member shown in FIG. 14.

At the secondary circumferential valve closure member 170 shown in FIG. 14, presence of a bend is indicated in dashed line, the angle 174 of this bend being shown in the side view of FIG. 15. The purpose of this secondary circumferential valve closure member preload bend angle 174 is to cause application of preload at the secondary circumferential valves formed when the secondary circumferential valve closure members 170 are attached to the exit plate 162 to form the exit plate subassembly 160. In a preferred embodiment, this secondary circumferential valve closure member preload bend angle 174 might be on the order of 30 degrees. The bend line indicated in dashed line at FIG. 14 separates the secondary circumferential valve closure member 170 into a closure portion to the left of the bend line, and an attachment portion to the right of the bend line, as seen in the drawing. The closure portion of the secondary circumferential valve closure member 170 has dimensions larger than the dimensions of the secondary circumferential valve port 163 by the amount of a closure member interference of, for example, 0.025 inch on all sides of the secondary circumferential valves except the proximal side of the secondary circumferential valve closure member 170, where a closure member interference (valve seat) of only 0.015 inch might be required. As with the closure member interference 139 at the closure members 143, 146 of the closure plate 140, the closure member interference at the secondary circumferential valve closure member 170 is the amount by which the edges of the secondary circumferential valve closure member 170 extend beyond the edges of the secondary circumferential valve port 163, as viewed in the axial direction, when the secondary circumferential valve is in its closed configuration. This secondary circumferential valve closure member interference represents the width of the valve seat at the periphery of the secondary circumferential valve port 163 on the downstream side of the exit plate 162. The secondary circumferential valve closure member 170 seals against this valve seat when in its closed configuration.

For example, if the secondary circumferential valve port length 172 is 0.300 inch and the secondary circumferential valve port width 173 is 0.150 inch, the closure portion of the secondary circumferential valve closure member 170 might have a length of 0.340 inch and a width of 0.200 inch.

During assembly of the exit plate subassembly 160, the attachment portion of the secondary circumferential valve closure member 170 might be attached, for example by spot-welding, to the exit plate 162 such that the secondary circumferential valve closure member 170 is aligned with the secondary circumferential valve port 163. Doing this at each of the four secondary circumferential valve locations will result in formation of four cantilever-like closure members 170. Each cantilever-like closure member 170 can then be said to have a proximal end, also referred to as its base, at its point of attachment to the exit plate 162. Furthermore, each cantilever-like closure member 170 can then be said to have a distal end, also referred to as its tip, opposite its proximal end. The closure members 170 in the present embodiment thus constitute cantilever-like springs, the restoring force of which allows the closure members 170 to act as variable-resistance bypass valves permitting increasing diversion of flow away from the turbine jets 129 and/or the circumferential valve sloped exit passages 178 with increasing flow into the shroud inlet 125. Such partial diversion of flow from the turbine jets 129 and/or the circumferential valve sloped exit passages 178 to the secondary circumferential valves permits regulation of pressure and/or rotational velocity. Moreover, to the extent that the secondary circumferential valves are torque-producing valves capable of applying a counterrotational torque in a direction opposite the direction of the torque from the jets 129 of the turbine shroud 120, this is also effective in regulation of rotational velocity.

In aligning the secondary circumferential valve closure members 170 to the secondary circumferential valve ports 163, the closure portion of a secondary circumferential valve closure member 170 might be oriented relative to a secondary circumferential valve port 163 so as to form a valve seat of 0.025 inch everywhere except at the proximal side of the secondary circumferential valve closure member 170, where a closure member interference (valve seat) of only 0.015 inch might be required. At FIG. 12, this valve seat can be seen between the outer edge of the secondary circumferential valve port 163, shown in dashed line, and the outer edge of the secondary circumferential valve closure member 170, shown in solid line, and is most readily apparent at the secondary circumferential valve in the upper right quadrant of the drawing, where the secondary circumferential valve closure member 170 is shown in cutaway fashion to better reveal the secondary circumferential valve port 163 therebelow.

Moreover, during this attachment operation, the attachment portion of the secondary circumferential valve closure member 170 is spot-welded or otherwise made to lie flush against the downstream side of the exit plate 162, causing the secondary circumferential valve closure member 170 to be deflected through the secondary circumferential valve closure member preload bend angle 174. Deflection of the secondary circumferential valve closure member 170 through this secondary circumferential valve closure member preload bend angle 174 during assembly causes the upstream side of the secondary circumferential valve closure member 170 to be preloaded against the downstream side of the corresponding secondary circumferential valve port 163. The magnitude of this preload at the distal end of the cantilever-like secondary circumferential valve closure member 170 will be approximately equal to the secondary circumferential valve port length 172 times the sine of the secondary circumferential valve closure member preload bend angle 174 times the spring constant of the cantilever-like secondary circumferential valve closure member 170.

There is no particular limitation with respect to material or thickness of the secondary circumferential valve closure members 170, but as one example, full-hard precision stainless steel (for example, CRES AISI Type 302 of hardness 40-45 Rc) of thickness 0.003 inch, having surface passivation treatment in accordance with MIL-S-5002, might be employed. Material and thickness, as well as dimensions, of the secondary circumferential valve closure members 170 should be chosen to allow the bypass valves formed by combination of the entrance ports 163 and the closure members 170 to perform as desired for regulation of pressure and/or rotational velocity. In particular, dimensions should be chosen so as to permit each of the closure members 170 to deflect with a spring force as appropriate for regulation in response to application of fluid pressure thereto over the effective surface area of the entrance ports 163.

Referring to FIG. 16, this is a perspective rear view, as seen from the downstream direction, showing where torque-producing fluid exits the turbine subassembly 115 of the present embodiment. In the present embodiment, a set of jets 129 at the turbine shroud 120 expel fluid in clockwise fashion about the axis of the turbine subassembly 115 so as to cause application of a torque in a counterclockwise direction as viewed from the downstream side thereof. The direction of the torque from this set of jets 129, this torque acting in a counterclockwise direction as seen from the downstream side in the present embodiment, is referred to herein as the rotational direction. There is of course no objection to employment of a turbine subassembly 115 which is, for example, the mirror image of that described with reference to the drawings. In such a mirror-image variation, the direction of flow at the jets 129 would be reversed, as would the respective directions of flow at the circumferential valves and the secondary circumferential valves, but regardless of how implemented, the direction of the torque produced by the set of jets 129 at the turbine shroud 120 is referred to herein as the rotational direction. Furthermore, the counterrotational direction is taken to be opposite the rotational direction.

In the present embodiment, fluid passing through the (primary) circumferential valves that does not exit the turbine subassembly 115 by way of the secondary circumferential valves travels along conduit-like features including the closure plate circumferential valve conduit-side clearance passages 148 to exit the turbine subassembly 115 by way of the circumferential valve sloped exit passages 178. Here, the (primary) circumferential valve entrance port 133, the circumferential valve closure member 143, the circumferential valve intermediary passage 153, and the circumferential valve sloped exit passage 178 cooperate to form a path containing a valve, this valve being the (primary) circumferential valve. In the present embodiment, fluid traveling along this path to exit the turbine subassembly 115 by way of the circumferential valve sloped exit passages 178 causes application of a torque in the same direction as the torque produced by the set of jets 129 at the turbine shroud 120, this torque being in the rotational direction, which in the present embodiment is counterclockwise as viewed from the downstream side. To the extent that the fluid exiting the turbine subassembly 115 by way of the circumferential valve sloped exit passages 178 causes application of a torque about the rotational axis of the turbine subassembly 115, this fluid may be described as engaging in jetting, and the combined features responsible for diverting flow of this fluid as it passes through the turbine subassembly 115 may be referred to as another set of jets. Note that although this jetting by fluid exiting the turbine subassembly 115 by way of the circumferential valve sloped exit passages 178 results in application of torque in a rotational direction in the present embodiment, there is no particular objection to an embodiment in which the circumferential valves are the mirror images of those described with reference to the drawings or are otherwise reversed in orientation so as to cause application of a torque in a counterrotational direction.

Conversely, in the present embodiment, fluid passing through the (primary) circumferential valves that does exit the turbine subassembly 115 by way of the secondary circumferential valves causes application of a torque in the opposite direction as the torque produced by the set of jets 129 at the turbine shroud 120, this torque being in the counterrotational direction, which in the present embodiment is clockwise as viewed from the downstream side. Here, the (primary) circumferential valve entrance port 133, the circumferential valve closure member 143, the circumferential valve intermediary passage 153, and the secondary circumferential valve port 163 cooperate to form a path containing another valve in addition to the valve mentioned above, this other valve being the secondary circumferential valve. To the extent that fluid traveling along this path to exit the turbine subassembly 115 by way of the secondary circumferential valves causes application of a torque about the rotational axis of the turbine subassembly 115, this fluid may be described as engaging in jetting, and the combined features responsible for diverting flow of this fluid as it passes through the turbine subassembly 115 may be referred to as yet another set of jets. Note that although this jetting by fluid exiting the turbine subassembly 115 by way of the secondary circumferential valves results in application of torque in a counterrotational direction in the present embodiment, there is no particular objection to an embodiment in which the secondary circumferential valves are the mirror images of those described with reference to the drawings or are otherwise reversed in orientation so as to cause application of a torque in a rotational direction.

For adequate regulation at high flow rates, it is preferred that there be at least some jets that apply a counterrotational torque about the axis of rotation of the turbine subassembly 115. In the present embodiment, this role is served by the secondary circumferential valves acting as what was referred to above as yet another set of jets.

Although not indicated at FIG. 16, fluid exiting the turbine subassembly 115 by way of the radial valves, partially visible in the drawing beneath the fingers 166 of the exit plate 162, causes application of substantially no net torque about the axis of rotation of the turbine subassembly 115. Here, the radial valve entrance port 136, the radial valve closure member 146, the radial valve intermediary passage 156, and the radial valve exit passage including the conduit- and nonconduit-side cutouts 168, 169 and the space therebetween to the upstream side of the bent finger 166 cooperate to form a path containing yet another valve, this valve being the radial valve.

The turbine subassembly 115 of the mass flowmeter 100 in the embodiment described above therefore has a set of jets that apply a torque, this being in a rotational direction, about the rotational axis of the turbine subassembly 115; another set of jets that apply another torque, this being in a rotational direction, about the rotational axis of the turbine subassembly 115; and yet another set of jets that apply yet another torque, this being in a counterrotational direction, about the rotational axis of the turbine subassembly 115. Furthermore, the laminated bypass valve structure at the turbine subassembly 115 of the mass flowmeter 100 in the embodiment described above includes twelve bypass valves, four of these being (primary) circumferential valves formed by combination of the circumferential valve entrance ports 133 and the circumferential valve closure members 143, four of these being radial valves formed by combination of the radial valve entrance ports 136 and the radial valve closure members 146, and four of these being secondary circumferential valves formed by combination of the secondary circumferential valve ports 163 and the secondary circumferential valve closure members 170.

The closure members 143, 146, 170 of these twelve bypass valves may be modeled as cantilever springs, in which case one of ordinary skill in the art will be able to calculate the spring constants as well as the preloads, if any, with which these closure members 143, 146, 170 press against their respective entrance ports 133, 136, 163, from the exemplary materials and dimensions given above. Furthermore, one of ordinary skill in the art will be able to adjust these spring constant and preload values to reflect the different effective surface areas of the closure members 143, 146, 170 so as to determine at what pressures the respective preloads are overcome, and once overcome, how deflection varies as a function of pressure. One of ordinary skill in the art will, furthermore, be able to relate the pressures at which such respective preloads are overcome to threshold values for rate of flow of fluid through the mass flowmeter 100 sufficient to produce such pressures at the respective valves. What is meant here by adjustment to reflect different effective surface areas of closure members 143, 146, 170 is that, where closure members 143, 146, 170 expose different surface areas to pressure of fluid upstream from those closure members 143, 146, 170, these different effective surface areas must be taken into account when comparing relative tendency for such pressure to open and deflect the closure members 143, 146, 170. One of ordinary skill in the art will be able to calculate surface area from exemplary dimensions given above for length and width. This preload or spring constant as adjusted for effective surface area of the closure member in question is referred to herein as an effective preload or an effective spring constant.

When calculated for the exemplary materials and dimensions given for the embodiment described above, it is found that there is substantially no preload at the (primary) circumferential valves, and that the effective preload at the secondary circumferential valves is approximately three times the effective preload at the radial valves. It is furthermore found, for the exemplary materials and dimensions given above, that the effective spring constant at the (primary) circumferential valves is approximately equal to the effective spring constant at the secondary circumferential valves, and that the effective spring constant at the radial valves is on the order of between four and five times the effective spring constant at either the (primary) circumferential valves or the secondary circumferential valves. That is, in the present embodiment, the respective effective preloads (as adjusted for surface area) are overcome and the valves successively begin to open with increasing pressure in the order (primary) circumferential valve, radial valve, secondary circumferential valve. Moreover, in the present embodiment, the respective effective spring constants (as adjusted for surface area) at the respective valves increase in stiffness in the order primary/secondary circumferential valve, radial valve. Note that where a valve closure member is preloaded against its valve seat, this will cause the valve in question to open only when the pressure upstream therefrom acting on that closure member increases above a prescribed threshold pressure value. Furthermore, one of ordinary skill in the art will be able to relate such prescribed threshold pressure values to prescribed threshold values for rate of flow of fluid through the mass flowmeter 100.

Note that all of the bypass valves will not necessarily be exposed to the same pressure as fluid flows through the mass flowmeter 100. Although the relatively large and unconstricted cavity between the turbine-side hub 111 and the tapered portion 127 of the turbine shroud 120 in the present embodiment will tend to cause the jets 129 at the turbine shroud 120, the (primary) circumferential valves, and the radial valves to be exposed at their respective upstream sides to approximately the same pressure, the pressure to which the secondary circumferential valves are exposed at their upstream sides is likely to be reduced in voltage-divider-like fashion. This is so because the chamber-like space in the portion of the conduit-like passage formed by the closure plate circumferential valve conduit-side clearance passage 148 and the circumferential valve intermediary passage 153 at the upstream side of each of the secondary circumferential valves represents an intermediate point between the series resistances represented by the (primary) circumferential valve upstream therefrom and the circumferential valve sloped exit passage 178 downstream therefrom. That is, in the present embodiment, the upstream side of the secondary circumferential valve is located at a point that is intermediate between the fluid resistance of the (primary) circumferential valve and the fluid resistance of the circumferential valve sloped exit passage 178, which is to say that the pressure at this intermediate point can be expected to be intermediate between the pressure upstream of the (primary) circumferential valve and the pressure downstream of the circumferential valve sloped exit passage 178. Note, incidentally, that as fluid at the space in the cavity between the turbine-side hub 111 and the tapered portion 127 of the turbine shroud 120 can pass through the laminated bypass valve structure by way of the radial valves or by way of the (primary) circumferential valves (whether passing through the latter to exit the turbine subassembly 115 by way of the circumferential valve sloped exit passages 178 or by way of the secondary circumferential valves), the radial valves can be said to be arranged in parallel fashion with respect to the (primary) circumferential valves. Note, furthermore, that as fluid exiting the turbine subassembly 115 by way of the secondary circumferential valves must first pass through the (primary) circumferential valves, the secondary circumferential valves can be said to be arranged in series with and downstream from the (primary) circumferential valves.

Figure 17:
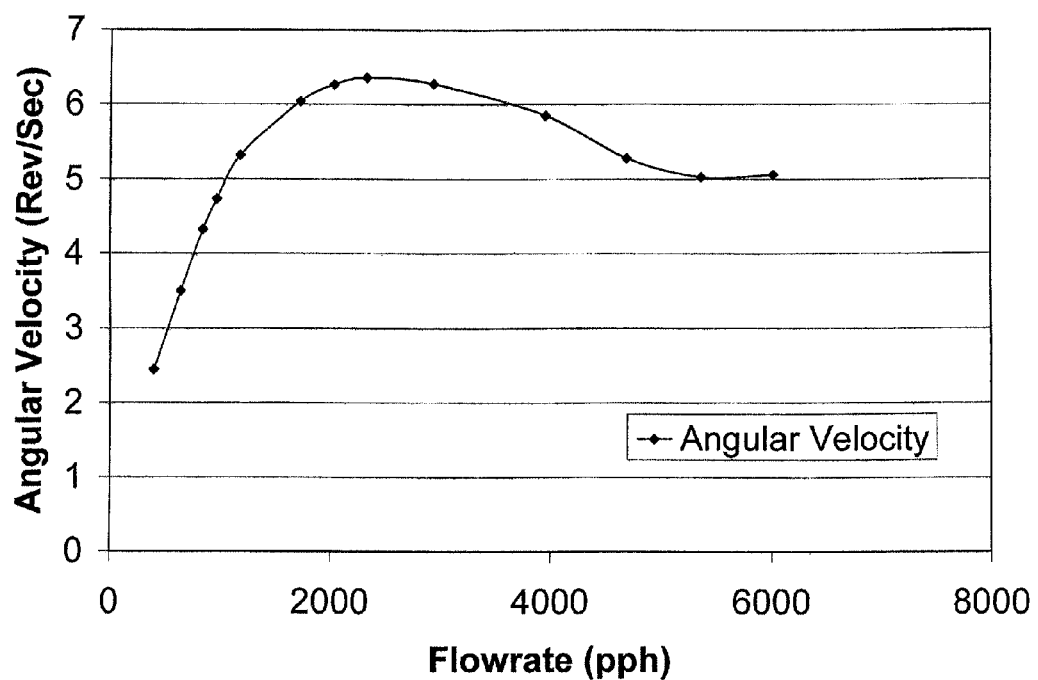
FIG. 17 is a graph showing angular velocity versus flow rate as measured in a working example of the mass flowmeter described with reference to FIGS. 1 through 16.

Referring to FIG. 17, this is a graph showing results of measurement of angular velocity in revolutions per second versus mass flow rate in pounds per hour in a working example of a mass flowmeter 100 constructed using the exemplary materials and dimensions given in the description above with reference to FIGS. 1 through 16. As can be seen from the graph, the mass flowmeter 100 exhibits good regulation over the range measured.

As flow rate through the mass flowmeter 100 of the embodiment employing the exemplary materials and dimensions given in the above description increases, the following is thought to occur.

To wit, at very low flow rates, all bypass valves are closed or very nearly closed, and substantially all flow passes through the turbine subassembly 115 by way of the jets 129 at the turbine shroud 120. At this time, the curve in FIG. 17 showing turbine rotational velocity as a function of flow rate is steepest, jetting at the jets 129 of the turbine shroud 120 causing the turbine to spin in a counterclockwise direction as viewed from downstream side thereof.

As flow rate is increased, there being no preload at the (primary) circumferential valves, these start to open against the bias of their comparatively weak effective spring constants, causing flow to be partially diverted from the jets 129 at the turbine shroud 120 to the (primary) circumferential valves. Once open, the (primary) circumferential valves act as variable fluid resistors, showing decreased resistance to passage of fluid therethrough as these valves open in response to increasing pressure at the upstream side thereof. Such decreasing resistance of the (primary) circumferential valves with increasing pressure upstream therefrom results in an increasing amount of fluid, whether measured in absolute or fractional terms, that is diverted away from the jets 129 at the turbine shroud 120 and through the (primary) circumferential valves. At this time, as the effective preload at neither the radial valves nor the secondary circumferential valves is overcome, substantially all flow diverted from the jets 129 at the turbine shroud 120 exits the turbine subassembly 115 by way of the circumferential valve sloped exit passages 178. Fluid so diverted and exiting the turbine subassembly 115 by way of the circumferential valve sloped exit passage 178 applies a torque in the same direction, and with comparable torque moment arm, as fluid exiting the jets 129 at the turbine shroud 120.

Moreover, from the exemplary dimensions given above, the combined cross-sectional area of the circumferential valve sloped exit passages 178, this being the narrowest portion of the conduit-like passage downstream from the (primary) circumferential valve traveled by fluid that has passed through the (primary) circumferential valve when the secondary circumferential valve is closed, is not less than the combined cross-sectional area of the jet narrow-bore regions 121 of the jets 129 at the turbine shroud 120 in the present embodiment. More particularly, from the exemplary dimensions given above, the combined cross-sectional area of the circumferential valve sloped exit passages 178 in the present embodiment is between two and three times the combined cross-sectional area of the jet narrow-bore regions 121 of the jets 129 at the turbine shroud 120. Still more particularly, the combined cross-sectional area of the circumferential valve sloped exit passages 178 in the present embodiment is approximately two and one-half times the combined cross-sectional area of the jet narrow-bore regions 121 of the jets 129 at the turbine shroud 120. The moderately constraining circumferential valve sloped exit passages 178 therefore represent a fluid resistance capable of causing pressure at the upstream side of the secondary circumferential valves in the present embodiment to be intermediate between the pressure upstream of the (primary) circumferential valves and the pressure downstream of the circumferential valve sloped exit passages 178 in voltage-divider-like fashion. But regardless of how constraining the circumferential valve sloped exit passages 178 might be, opening of the (primary) circumferential valves nonetheless increases the total cross-sectional area of the combined passages through which fluid may flow in parallel fashion as that fluid goes through the turbine subassembly 115, decreasing pressure and/or jetted velocity relative to that which would otherwise exist, and thus regulating pressure and/or rotational velocity.

At such time, the fluid resistance of the path including the jets 129 at the turbine shroud 120 therefore combines with the fluid resistance of the path including the (primary) circumferential valves and the circumferential valve sloped exit passage 178 in parallel fashion, reducing overall fluid resistance of the turbine subassembly 115 but increasing the fraction of fluid exiting the turbine subassembly 115 by way of the path including the (primary) circumferential valves and the circumferential valve sloped exit passages 178. At this time, although jetting at the jets 129 of the turbine shroud 120 and jetting due to action of fluid exiting the turbine subassembly 115 by way of the circumferential valve sloped exit passages 178 both tend to cause the turbine to spin in a counterclockwise direction as viewed from downstream side thereof, the slope of the curve in FIG. 17 showing turbine rotational velocity as a function of flow rate becomes somewhat less steep, due to the reduced jetting effectiveness of fluid exiting the turbine subassembly 115 by way of the circumferential valve sloped exit passages 178 as compared with jetting at the jets 129 of the turbine shroud 120.

As flow rate is further increased, increased pressure in the cavity between the turbine-side hub 111 and the tapered portion 127 of the turbine shroud 120 causes the effective preload at the radial valves to be overcome, opening the radial valves against the bias of their comparatively stiff effective spring constants. In the present embodiment, the effective spring constant at the (primary) circumferential valves is on the same order as the effective spring constant at the secondary circumferential valves, and the effective spring constant at the radial valves is on the order of between four and five times stiffer than the effective spring constant at either the (primary) circumferential valves or the secondary circumferential valves. Once open, the radial valves act as variable fluid resistors, showing decreased resistance to passage of fluid therethrough as these valves open in response to increasing pressure at the upstream side thereof. Such decreasing resistance of the radial valves with increasing pressure upstream therefrom results in an increasing amount of fluid, whether measured in absolute or fractional terms, that is diverted away from the jets 129 at the turbine shroud 120 and through the radial valves. Fluid exiting the turbine subassembly 115 by way of the radial valves causes application of substantially no net torque about the axis of rotation of the turbine subassembly 115, but the increased cross-sectional area of the combined passages through which the fluid may now flow as it passes through the turbine subassembly 115 tends to decrease pressure and/or jetted velocity relative to that which would otherwise exist, thus regulating pressure and/or rotational velocity. At this time, the slope of the curve in FIG. 17 showing turbine rotational velocity as a function of flow rate becomes even less steep and starts to level off.

As flow rate is still further increased, fluid traveling past the partially open (primary) circumferential valves but unable to exit with sufficient rapidity through the circumferential valve sloped exit passages 178 causes pressure to increase at the intermediate point that is downstream from the (primary) circumferential valve but upstream from the circumferential valve sloped exit passage 178, the pressure at this intermediate point being substantially the pressure at the upstream side of the secondary circumferential valve, until the effective preload of the secondary circumferential valves is overcome, opening the secondary circumferential valves against the bias of their comparatively weak effective spring constants. Not only is the effective preload at the secondary circumferential valves in the present embodiment on the order of three times higher than the effective preload at the radial valves, but the fact that pressure at the upstream side of the secondary circumferential valve corresponds to that of an intermediate point in the series resistances represented by the (primary) circumferential valve upstream therefrom and the circumferential valve sloped exit passage 178 downstream therefrom means that the upstream sides of the secondary circumferential valves are not exposed to the full pressure present at the cavity between the turbine-side hub 111 and the tapered portion 127 of the turbine shroud 120, which means that the secondary circumferential valves do not begin to open in the present embodiment until well after the radial valves have begun to open.

Once open, the secondary circumferential valves act as variable fluid resistors, showing decreased resistance to passage of fluid therethrough as these valves open in response to increasing pressure at the upstream side thereof. Such decreasing resistance of the secondary circumferential valves with increasing pressure upstream therefrom results in an increasing amount of fluid, whether measured in absolute or fractional terms, that is diverted away from the jets 129 at the turbine shroud 120 and through the secondary circumferential valves. As with the other bypass valves, partial diversion of flow from the jets 129 at the turbine shroud 120, with resulting increased cross-sectional area of the combined passages through which the fluid may now flow as it passes through the turbine subassembly 115, tends to decrease pressure and/or jetted velocity relative to that which would otherwise exist, thus regulating pressure and/or rotational velocity. Moreover, fluid exiting the turbine subassembly 115 by way of the secondary circumferential valves applies a torque in the opposite direction (the clockwise direction as viewed from downstream side), and with comparable torque moment arm, as fluid exiting the turbine subassembly 115 by way of the jets 129 at the turbine shroud 120 or by way of the circumferential valve sloped exit passages 178. At this time, as the counterrotational torque due to jetting by fluid exiting the turbine subassembly 115 by way of the secondary circumferential valves starts to oppose the rotational torques due to jetting by fluid exiting the turbine subassembly 115 by way of the jets 129 at the turbine shroud 120 and jetting by fluid exiting the turbine subassembly 115 by way of the circumferential valve sloped exit passages 178, a point is reached at which the incremental increase in counterrotational torque produced by an increase in flow rate becomes greater than the incremental increase in rotational torque produced by that increase in flow rate, at which time the slope of the curve in FIG. 17 showing turbine rotational velocity as a function of flow rate goes from flat to negative, actually decreasing the rotational velocity of the turbine subassembly 115.

As described above, at least some embodiments of the present invention provide a motorless mass flowmeter having a turbine subassembly possessing a bypass valve system for regulation of pressure and/or rotational velocity. In some embodiments, such a bypass valve system permits the mass flowmeter to be sensitive enough to operate at low flow rates yet robust enough to operate without adverse effect at high flow rates. In some embodiments, the turbine subassembly of such a motorless mass flowmeter is capable of causing an impeller to rotate at rotational velocities within a preferred range without production of adverse phenomena such as high back-pressure over a wide range of flow rates. Furthermore, the bypass valve design of the turbine subassembly of the mass flowmeter in some embodiments is inexpensive and easy to manufacture due, for example, to employment of a laminated bypass valve structure that is easily manufacturable from layers of stamped or punched sheet metal.

Furthermore, some embodiments of the present invention may provide other benefits and advantages.

Although the present invention has been described in terms of an example in which fluid exiting the turbine subassembly 115 by way of the set of jets 129 at the turbine shroud 120 causes application of a torque in a counterclockwise direction about the rotational axis of the turbine subassembly 115 as viewed from the downstream side thereof, there is no objection to embodiments in which one or more of these jets 129 expel fluid in counterclockwise fashion so as to cause application of a torque in a clockwise direction as viewed from the downstream side. Furthermore, although the present invention has been described in terms of an example in which fluid passing through the (primary) circumferential valves and exiting the turbine subassembly 115 by way of the circumferential valve sloped exit passages 178 causes application of a torque in a counterclockwise direction about the rotational axis of the turbine subassembly 115 as viewed from the downstream side thereof, there is no objection to embodiments in which one or more of the (primary) circumferential valves and associated conduit-like features are arranged so as to expel fluid in counterclockwise fashion so as to cause application of a torque in a clockwise direction as viewed from the downstream side. Moreover, although the present invention has been described in terms of an example in which fluid passing through the (primary) circumferential valves and exiting the turbine subassembly 115 by way of the secondary circumferential valves causes application of a torque in a clockwise direction about the rotational axis of the turbine subassembly 115 as viewed from the downstream side thereof, there is no objection to embodiments in which one or more of the secondary circumferential valves are arranged so as to expel fluid in clockwise fashion so as to cause application of a torque in a counterclockwise direction as viewed from the downstream side.

Although the present invention has been described in terms of an example in which the closure members at the radial valves and the secondary circumferential valves have positive preloads but the closure members at the primary circumferential valves have substantially no preload, this embodiment has been presented merely for exemplary purposes, there being no objection to embodiments in which all valves employ substantially no preload, all valves employ positive preload(s), any subset of the valves employ substantially no preload, or any subset of the valves employ positive preload(s). Furthermore, although the present invention has been described in terms of an example in which the respective effective preloads (as adjusted for surface area) are overcome and the valves successively begin to open with increasing pressure in the order (primary) circumferential valve, radial valve, secondary circumferential valve, the present invention is not limited thereto, a great many variations being possible with respect to the order in which the respective valves open with increasing pressure. Moreover, where positive preloads are employed, although exemplary values have been suggested for these preloads based on preferred materials and dimensions given above, the present invention is not limited to these values, it being possible to employ a wide range of materials of varying dimensions to create a wide range of closure member preloads and effective surface areas while still carrying out adequate regulation of pressure and/or rotational velocity.

Although the present invention has been described in terms of an example in which the effective spring constant (as adjusted for surface area) at the respective valves increases in stiffness in the order primary/secondary circumferential valve, radial valve, the present invention is not limited thereto, a great many variations being possible with respect to the relative effective stiffnesses of the closure members at the respective valves. Moreover, although exemplary values have been suggested for these stiffnesses based on preferred materials and dimensions given above, the present invention is not limited to these values, it being possible to employ a wide range of materials of varying dimensions to create a wide range of closure member stiffnesses and effective surface areas while still carrying out adequate regulation of pressure and/or rotational velocity.

Although the circumferential valve closure member width 142 in the present embodiment is shown as being approximately equal to the radial valve closure member width 145, there is no particular objection to employment of different respective widths for these. Furthermore, the circumferential valve closure members 143 need not all have the same width, nor need the radial valve closure members 146 all have the same width. It is, however, preferred that the valves be laid out in symmetric and/or balanced fashion so that regulation does not adversely impact dynamic stability of the rotating internal parts of the mass flowmeter, particularly the mechanical system of the turbine subassembly 115. Moreover, to the extent that the widths of the circumferential valve entrance ports 133 and the radial valve entrance ports 136 described above, and the widths of the circumferential valve intermediary passages 153 and the radial valve intermediary passages 156 described above, respectively correspond in the present embodiment to the widths of the circumferential valve closure members 143 and the radial valve closure members 146, the foregoing should also be understood to apply thereto.

Although the closure members 143, 146 forming part of the (primary) circumferential valves in the embodiment described above were described as being integral with a (primary) closure plate 140 included among the plates 130, 140, 150, 162 of the laminated bypass valve structure of the turbine subassembly 115, and the secondary circumferential valve closure members 170 forming part of the secondary circumferential valves were described as being separately attached, for example by spot-welding, to the exit plate 162, there is no particular objection to embodiments in which the closure plate 140 is omitted and one or more of the closure members 143, 146 forming part of the (primary) circumferential valves are separately attached, for example by spot-welding, to the entrance plate 130, or to embodiments in which one or more of the secondary circumferential valve closure members 170 forming part of the secondary circumferential valves are made integral with a secondary closure plate that is added to the plates 130, 140, 150, 162 of the laminated bypass valve structure.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A motorless mass flowmeter having an inlet and an outlet for flow of fluid therethrough, the mass flowmeter comprising:
    a turbine subassembly;
    a drum rigidly connected to the turbine subassembly such that the drum rotates in accompaniment to rotation of the turbine subassembly; and
    an impeller rotationally coupled to the drum by way of a spring that allows relative rotation against the bias of the spring;
    wherein the turbine subassembly has a first set of jets causing a first torque to be applied about a rotational axis of the turbine subassembly as fluid flows therethrough, the first torque tending to cause the turbine subassembly to rotate in a first direction;
    the turbine subassembly has a second set of jets causing a second torque to be applied about the rotational axis of the turbine subassembly as fluid flows therethrough; and
    a first set of one or more bypass valves causing an increasing amount of fluid to be diverted from the first set of jets to the second set of jets with increasing flow of fluid through the mass flowmeter.

2. A motorless mass flowmeter according to claim 1 wherein the second torque tends to cause the turbine subassembly to rotate in the same direction as the first torque.

3. A motorless mass flowmeter according to claim 1 wherein the second torque tends to cause the turbine subassembly to rotate in a second direction that is opposite the first direction.

4. A motorless mass flowmeter according to claim 1 wherein the diversion of fluid from the first set of jets to the second set of jets and the application of the second torque about the rotational axis of the turbine subassembly by the first set of bypass valves only occurs when flow of fluid through the mass flowmeter is above a first threshold value.

5. A motorless mass flowmeter according to claim 1 wherein the turbine subassembly furthermore has
    a third set of jets causing a third torque to be applied about the rotational axis of the turbine subassembly as fluid flows therethrough; and
    a second set of one or more bypass valves causing an increasing amount of fluid to be diverted from the first set of jets to the third set of jets with increasing flow of fluid through the mass flowmeter.

6. A motorless mass flowmeter according to claim 5 wherein the third torque tends to cause the turbine subassembly to rotate in the same direction as the first torque.

7. A motorless mass flowmeter according to claim 5 wherein the third torque tends to cause the turbine subassembly to rotate in a second direction that is opposite the first direction.

8. A motorless mass flowmeter according to claim 5 wherein the diversion of fluid from the first set of jets to the third set of jets and the application of the third torque about the rotational axis of the turbine subassembly by the second set of bypass valves only occurs when flow of fluid through the mass flowmeter is above a second threshold value.

9. A motorless mass flowmeter according to claim 5 wherein the turbine subassembly furthermore has
    a third set of one or more bypass valves causing an increasing amount of fluid to be diverted away from the first set of jets with increasing flow of fluid through the mass flowmeter, this diversion of fluid away from the first set of jets by the third set of bypass valves causing application of substantially no torque about the rotational axis of the turbine subassembly.

10. A motorless mass flowmeter according to claim 9 wherein the diversion of fluid away from the first set of jets with application of substantially no torque about the rotational axis of the turbine subassembly by the third set of bypass valves only occurs when flow of fluid through the mass flowmeter is above a third threshold value.

11. A motorless mass flowmeter according to claim 1 wherein the mass flowmeter furthermore comprises:

an internal flow straightener disposed downstream from the turbine subassembly and upstream from the impeller, the internal flow straightener reducing angular momentum of fluid as it passes from the turbine subassembly to the impeller; and a viscous decoupler disposed at the upstream side of the impeller, the viscous decoupler substantially preventing viscous drag of fluid from adversely affecting rotation of the impeller.

* * * * *